(12) United States Patent
Padmanabhan

(10) Patent No.: US 12,737,348 B2
(45) Date of Patent: Sep. 15, 2026

(54) DATABASE SYSTEM PUBLIC TRUST LEDGER ARCHITECTURE

(71) Applicant: Salesforce, Inc., San Francisco, CA (US)

(72) Inventor: Prithvi Krishnan Padmanabhan, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/410,366

(22) Filed: Aug. 24, 2021

(65) Prior Publication Data

US 2023/0043731 A1 Feb. 9, 2023

Related U.S. Application Data

(60) Provisional application No. 63/230,293, filed on Aug. 6, 2021.

(51) Int. Cl.
*G06F 16/23* (2019.01)
*G06F 9/30* (2018.01)
(Continued)

(52) U.S. Cl.
CPC ............ *G06F 16/2379* (2019.01); *G06F 9/30* (2013.01); *H04L 9/088* (2013.01); *H04L 9/30* (2013.01); *H04L 9/50* (2022.05)

(58) Field of Classification Search
CPC ............................... G06F 16/2379; H04L 9/30
(Continued)

(56) References Cited

U.S. PATENT DOCUMENTS 5,634,053 A 5/1997 Noble
5,834,053 A 11/1998 Dye
(Continued)

FOREIGN PATENT DOCUMENTS

AU 2019345039 A1 4/2021
AU 2019345040 A1 4/2021
(Continued)

OTHER PUBLICATIONS

Padmanabhan, Prithvi Krishnan et al., "Database System Public Trust Ledger Contract Linkage", U.S. Appl. No. 17/412,059, filed Aug. 25, 2021.
(Continued)

*Primary Examiner* — Md I Uddin
*Assistant Examiner* — Jessica N Le
(74) *Attorney, Agent, or Firm* — Polygon IP, LLP

(57) ABSTRACT

Techniques and mechanisms described herein relate to a database system. A digital asset referenced in one or more database tables within an on-demand database system accessible to a plurality of entities may be identified. The digital asset may be owned by a first one of the plurality of entities. A smart contract that includes a token identifying the digital asset may be generated. The smart contract may be recorded within a distributed trust ledger. The token may be owned by a first account within the distributed trust ledger. The on-demand database system may include a correspondence linking the first entity with the first account. The on-demand database system may be updated to include a reference linking the digital asset with the token.

15 Claims, 15 Drawing Sheets

(51) Int. Cl.
*H04L 9/00* (2022.01)
*H04L 9/08* (2006.01)
*H04L 9/30* (2006.01)

(58) Field of Classification Search
USPC .......................................................... 707/825
See application file for complete search history.

(56) References Cited

U.S. PATENT DOCUMENTS 6,333,929 B1 12/2001 Drottar
7,587,348 B2 9/2009 Liao
7,730,478 B2 6/2010 Weissman
8,095,463 B1 1/2012 Hartmaier
9,027,094 B1 5/2015 Balazs
9,569,700 B1 2/2017 Santos
9,646,029 B1 5/2017 Baird, III
9,690,822 B2 6/2017 Roy-Faderman
9,846,029 B2 12/2017 Dumoulin
9,875,510 B1 1/2018 Kasper
9,978,067 B1 5/2018 Sadaghiani
9,998,286 B1 6/2018 Ramathal
10,042,636 B1 8/2018 Srivastava
10,102,265 B1 10/2018 Madisetti
10,102,526 B1 10/2018 Madisetti
10,210,527 B2 2/2019 Radocchia
10,311,230 B2 6/2019 Jagadeesan
10,373,129 B1 8/2019 James
10,425,399 B2 9/2019 Kravitz
10,482,466 B1 11/2019 Walters
10,505,726 B1 12/2019 Andon
10,521,196 B1 12/2019 Wang
10,521,780 B1 12/2019 Hopkins, III
10,528,551 B2 1/2020 Li
10,541,821 B2 1/2020 Toll
10,585,657 B2 3/2020 Padmanabhan
10,600,009 B1 3/2020 Augustine
10,701,054 B2 6/2020 Padmanabhan et al.
10,705,580 B2 7/2020 Gross
10,728,283 B1 7/2020 Dobrek
10,762,079 B2 9/2020 Shi
10,762,506 B1 9/2020 Cash
10,885,567 B2 1/2021 Bhattacherjee
10,915,891 B1 * 2/2021 Winklevoss .......... H04L 9/3255
10,929,866 B1 2/2021 Qi
11,038,771 B2 6/2021 Padmanabhan
11,082,226 B2 8/2021 Hildebrand
11,128,465 B2 9/2021 Hildebrand
11,144,335 B2 10/2021 Padmanabhan
11,157,484 B2 10/2021 Padmanabhan
11,164,254 B1 * 11/2021 Gordon, III .............. H04L 9/12
11,184,394 B1 11/2021 Dobrek
11,200,569 B1 * 12/2021 James .................. G06Q 20/381
11,244,313 B2 2/2022 Padmanabhan
11,245,514 B1 * 2/2022 Mao ...................... H04L 9/3247
11,288,280 B2 3/2022 Padmanabhan
11,288,736 B1 3/2022 Jette
11,308,487 B1 4/2022 Foster
11,315,138 B1 4/2022 Olson
11,315,193 B1 4/2022 Kim
11,334,883 B1 5/2022 Auerbach
11,341,494 B2 5/2022 Warner
11,372,635 B2 6/2022 Padmanabhan
11,379,429 B1 7/2022 Lupowitz
11,430,066 B2 8/2022 Doney
11,431,486 B2 8/2022 Padmanabhan
11,431,693 B2 8/2022 Padmanabhan
11,468,406 B2 10/2022 Padmanabhan
11,468,431 B2 10/2022 Williams
11,469,886 B2 10/2022 Padmanabhan
11,488,176 B2 11/2022 Padmanabhan
11,501,370 B1 * 11/2022 Paya .................. G06Q 20/3676
11,544,762 B2 1/2023 Mao
11,568,437 B2 1/2023 Padmanabhan
11,582,040 B2 * 2/2023 Soundararajan ........ H04L 63/10
11,611,560 B2 3/2023 Padmanabhan
11,620,645 B2 * 4/2023 Mallela ................ G06Q 20/223 705/69
11,625,731 B2 4/2023 Negi
11,636,098 B2 4/2023 Padmanabhan
11,671,531 B1 6/2023 Mudireddy
11,743,137 B2 8/2023 Padmanabhan
11,757,651 B2 9/2023 Sekar
11,764,950 B2 9/2023 Padmanabhan
11,770,445 B2 9/2023 Padmanabhan
11,783,024 B2 10/2023 Padmanabhan
2005/0102159 A1 5/2005 Mondshine
2006/0118611 A1 6/2006 Michelsen
2006/0259361 A1 11/2006 Barhydt
2007/0125840 A1 6/2007 Law
2008/0066165 A1 3/2008 Rosenoer
2008/0140578 A1 6/2008 Felt
2009/0037949 A1 2/2009 Birch
2009/0119299 A1 5/2009 Rhodes
2009/0217034 A1 8/2009 Sudia
2011/0246460 A1 10/2011 Hsieh
2011/0265069 A1 10/2011 Fee
2011/0276892 A1 11/2011 Jensen-Horne
2011/0289140 A1 11/2011 Pletter
2013/0041934 A1 2/2013 Annamalaisami
2013/0151515 A1 6/2013 Davis
2013/0226682 A1 8/2013 Grossman
2013/0346173 A1 12/2013 Chandoor
2014/0039990 A1 2/2014 Ken
2014/0209673 A1 7/2014 Phillips
2014/0278894 A1 9/2014 Toumayan
2014/0279857 A1 9/2014 Bharadwaj
2015/0026061 A1 1/2015 Siegel
2015/0213443 A1 * 7/2015 Geffon ............... G06Q 20/3821 705/76
2016/0012465 A1 1/2016 Sharp
2016/0027229 A1 1/2016 Spanos
2016/0042383 A1 2/2016 Joshi
2016/0092872 A1 3/2016 Prakash
2016/0148251 A1 5/2016 Thomas
2016/0192165 A1 6/2016 Agulnik
2016/0203448 A1 7/2016 Metnick
2016/0260169 A1 9/2016 Arnold
2016/0292680 A1 10/2016 Wilson, Jr.
2016/0350860 A1 12/2016 Dintenfass
2016/0358267 A1 12/2016 Arjomand
2016/0364743 A1 12/2016 St Lawrence
2017/0005804 A1 * 1/2017 Zinder .................. H04L 9/3239
2017/0046698 A1 2/2017 Haldenby
2017/0085545 A1 3/2017 Lohe
2017/0103167 A1 4/2017 Shah
2017/0103472 A1 4/2017 Shah
2017/0111175 A1 4/2017 Oberhauser
2017/0132625 A1 5/2017 Kennedy
2017/0132630 A1 5/2017 Castinado
2017/0140145 A1 5/2017 Shah
2017/0161833 A1 6/2017 Porth
2017/0200157 A1 7/2017 Bergeon
2017/0206603 A1 7/2017 Al-Masoud
2017/0214522 A1 7/2017 Code
2017/0230189 A1 8/2017 Toll
2017/0235094 A1 8/2017 Osaka
2017/0236094 A1 8/2017 Shah
2017/0236215 A1 8/2017 Eisen
2017/0242887 A1 8/2017 Zhao
2017/0272901 A1 9/2017 Chen
2017/0289111 A1 10/2017 Voell
2017/0295021 A1 10/2017 Aranda Gutiérrez
2017/0295023 A1 10/2017 Madhavan
2017/0300627 A1 10/2017 Giordano
2017/0300872 A1 10/2017 Brown
2017/0300876 A1 10/2017 Musiala, Jr.
2017/0323392 A1 11/2017 Kasper
2017/0337534 A1 11/2017 Goeringer
2017/0344988 A1 11/2017 Cusden
2017/0353309 A1 12/2017 Gray
2017/0364450 A1 12/2017 Struttmann
2017/0364549 A1 12/2017 Abalos
2017/0364698 A1 12/2017 Goldfarb
2017/0364699 A1 12/2017 Goldfarb

(56) References Cited

U.S. PATENT DOCUMENTS

2017/0364700 A1 12/2017 Goldfarb
2017/0364701 A1 12/2017 Struttmann
2017/0364893 A1 12/2017 Kurian
2017/0364899 A1 12/2017 Watson
2017/0365353 A1 12/2017 Redaelli
2017/0366353 A1 12/2017 Struttmann
2017/0372300 A1 12/2017 Dunlevy
2017/0372417 A1* 12/2017 Gaddam ................ G06Q 20/06
2018/0005186 A1 1/2018 Hunn
2018/0006831 A1 1/2018 Toll
2018/0019879 A1 1/2018 Kravitz
2018/0026505 A1 1/2018 Galmiche
2018/0039667 A1 2/2018 Pierce
2018/0041345 A1 2/2018 Maim
2018/0060496 A1 3/2018 Bulleit
2018/0082256 A1 3/2018 Tummuru
2018/0088928 A1 3/2018 Smith
2018/0096360 A1 4/2018 Christidis
2018/0117446 A1 5/2018 Tran
2018/0117447 A1 5/2018 Tran
2018/0123779 A1 5/2018 Zhang
2018/0123882 A1 5/2018 Anderson
2018/0136633 A1 5/2018 Small
2018/0139186 A1 5/2018 Castagna
2018/0144042 A1 5/2018 Sheng
2018/0158162 A1 6/2018 Ramasamy
2018/0165416 A1 6/2018 Saxena
2018/0181768 A1 6/2018 Leporini
2018/0189100 A1 7/2018 Nemoto
2018/0191503 A1 7/2018 Alwar
2018/0204111 A1 7/2018 Zadeh
2018/0204213 A1 7/2018 Zappier
2018/0218176 A1 8/2018 Voorhees
2018/0219836 A1* 8/2018 Peterson ............. H04L 67/1097
2018/0225611 A1 8/2018 Daniel
2018/0232644 A1 8/2018 Acharya
2018/0232659 A1 8/2018 Ranatunga
2018/0235839 A1 8/2018 Johnson
2018/0239897 A1 8/2018 Ventura
2018/0241573 A1 8/2018 Ramathal
2018/0247191 A1 8/2018 Katz
2018/0253661 A1 9/2018 Strauss
2018/0260125 A1 9/2018 Botes
2018/0260212 A1 9/2018 Wisnovsky
2018/0262505 A1 9/2018 Ligatti
2018/0268401 A1 9/2018 Ortiz
2018/0268483 A1 9/2018 Jayaram
2018/0268506 A1 9/2018 Wodetzki
2018/0276553 A1 9/2018 Redkar
2018/0276626 A1 9/2018 Laiben
2018/0285412 A1 10/2018 Zhuang
2018/0285839 A1 10/2018 Yang
2018/0285996 A1 10/2018 Ma
2018/0300382 A1 10/2018 Madisetti
2018/0307990 A1 10/2018 Chawla
2018/0311930 A1 11/2018 Sakamoto
2018/0322485 A1 11/2018 Jayaram
2018/0323963 A1 11/2018 Stollman
2018/0343238 A1 11/2018 Tola
2018/0365686 A1 12/2018 Kondo
2018/0367528 A1 12/2018 Schwarz
2018/0372502 A1 12/2018 Rønnow
2018/0373776 A1 12/2018 Madisetti
2018/0374173 A1 12/2018 Chen
2019/0012249 A1 1/2019 Mercuri
2019/0012595 A1 1/2019 Beser
2019/0012695 A1 1/2019 Bishnoi
2019/0019090 A1 1/2019 Chacko
2019/0020629 A1 1/2019 Baird, III
2019/0020716 A1 1/2019 Fukuchi
2019/0020829 A1 1/2019 Nebiker
2019/0028276 A1 1/2019 Pierce
2019/0034404 A1 1/2019 Anderson
2019/0035018 A1 1/2019 Nolan
2019/0050855 A1 2/2019 Martino
2019/0052454 A1 2/2019 Wright
2019/0057223 A1 2/2019 Hanna
2019/0058581 A1 2/2019 Wood
2019/0058709 A1 2/2019 Kempf
2019/0080406 A1 3/2019 Molinari
2019/0081796 A1 3/2019 Chow
2019/0086988 A1 3/2019 He
2019/0087598 A1 3/2019 Adkins
2019/0087892 A1 3/2019 Pinski
2019/0102409 A1 4/2019 Shi
2019/0102423 A1 4/2019 Little
2019/0108543 A1 4/2019 Chan
2019/0109702 A1 4/2019 Maggu
2019/0109709 A1 4/2019 Wu
2019/0109713 A1 4/2019 Clark
2019/0122186 A1 4/2019 Kano
2019/0132350 A1 5/2019 Smith
2019/0146979 A1* 5/2019 Madisetti ............ G06F 16/1805
707/634
2019/0147532 A1 5/2019 Singh
2019/0149325 A1 5/2019 Garagiola
2019/0149334 A1 5/2019 Van Der Velden
2019/0158270 A1 5/2019 Berti
2019/0164156 A1 5/2019 Lindemann
2019/0164220 A1 5/2019 Raj
2019/0172282 A1 6/2019 Patel
2019/0182047 A1 6/2019 Andreina
2019/0188706 A1 6/2019 Mccurtis
2019/0215149 A1 7/2019 Ramasamy
2019/0220836 A1 7/2019 Caldwell
2019/0228006 A1 7/2019 Tormasov
2019/0236559 A1 8/2019 Padmanabhan
2019/0236562 A1 8/2019 Padmanabhan
2019/0236598 A1 8/2019 Padmanabhan
2019/0236606 A1 8/2019 Padmanabhan et al.
2019/0238316 A1 8/2019 Padmanabhan
2019/0238525 A1* 8/2019 Padmanabhan ....... H04L 63/101
2019/0244243 A1 8/2019 Goldberg
2019/0251079 A1 8/2019 Yan
2019/0280862 A1 9/2019 Crego
2019/0287026 A1 9/2019 Calmon
2019/0287116 A1 9/2019 Karantzis
2019/0295050 A1 9/2019 Chalkias
2019/0295114 A1 9/2019 Pavletic
2019/0303121 A1 10/2019 Padmanabhan
2019/0303445 A1 10/2019 Padmanabhan
2019/0303579 A1 10/2019 Reddy
2019/0303892 A1 10/2019 Yantis
2019/0303926 A1 10/2019 Yantis
2019/0306235 A1 10/2019 Veale
2019/0318122 A1* 10/2019 Hockey ............... H04L 63/0853
2019/0333033 A1* 10/2019 Finlow-Bates .... G06Q 20/3829
2019/0334716 A1 10/2019 Kocsis
2019/0340623 A1 11/2019 Rivkind
2019/0340689 A1 11/2019 Gordon, III
2019/0370544 A1 12/2019 Wright, Jr.
2019/0370634 A1 12/2019 Ferreira Moreno
2019/0370866 A1 12/2019 Lawbaugh
2019/0377806 A1 12/2019 Padmanabhan et al.
2019/0378069 A1 12/2019 Deshpande
2019/0385160 A1 12/2019 Safak
2019/0385236 A1* 12/2019 McConnell ........ G06Q 20/0655
2019/0386834 A1 12/2019 Furukawa
2019/0392439 A1 12/2019 Perullo
2019/0392457 A1 12/2019 Kuntagod
2019/0394175 A1 12/2019 Zhang
2020/0005284 A1 1/2020 Vijayan
2020/0019923 A1 1/2020 Santhar
2020/0027005 A1 1/2020 Harrison
2020/0027080 A1 1/2020 Holland
2020/0027090 A1 1/2020 Braundmeier
2020/0034457 A1 1/2020 Brody
2020/0036515 A1 1/2020 Chari
2020/0042939 A1 2/2020 Padmanabhan
2020/0050613 A1 2/2020 Gauvreau, Jr.
2020/0057860 A1 2/2020 Patil
2020/0057994 A1 2/2020 Hunn
2020/0074461 A1 3/2020 Derosa-Grund
2020/0074477 A1 3/2020 Lamba

(56) References Cited

U.S. PATENT DOCUMENTS

2020/0074515 A1 3/2020 Ghatage
2020/0076574 A1 3/2020 Austin
2020/0076884 A1 3/2020 Li
2020/0089663 A1 3/2020 Padmanabhan
2020/0089670 A1 3/2020 Padmanabhan et al.
2020/0089671 A1 3/2020 Padmanabhan et al.
2020/0089672 A1 3/2020 Velisetti et al.
2020/0089895 A1 3/2020 Gollogly
2020/0092362 A1 3/2020 Balaji
2020/0104636 A1 4/2020 Halevi
2020/0112434 A1* 4/2020 Goodson ............. H02J 13/0004
2020/0118011 A1 4/2020 Kaiser
2020/0119906 A1 4/2020 Das
2020/0133955 A1 4/2020 Padmanabhan et al.
2020/0134613 A1 4/2020 Jiang
2020/0134656 A1 4/2020 Padmanabhan
2020/0137082 A1 4/2020 Jimenez-Delgado
2020/0143267 A1 5/2020 Gidney
2020/0143367 A1 5/2020 Lebeau
2020/0143372 A1 5/2020 Liu
2020/0159847 A1 5/2020 Smith
2020/0167512 A1 5/2020 Chitra
2020/0169546 A1 5/2020 Padmanabhan
2020/0175506 A1* 6/2020 Snow ................. G06Q 20/0655
2020/0184558 A1* 6/2020 Crumb ................... G06Q 40/02
2020/0186338 A1 6/2020 Andon
2020/0186523 A1 6/2020 Kursun
2020/0200824 A1 6/2020 Narayanaswami
2020/0202038 A1 6/2020 Zhang
2020/0204375 A1 6/2020 Coulmeau
2020/0204557 A1 6/2020 Singh
2020/0213127 A1* 7/2020 Maniyar ............. G06F 16/2379
2020/0234386 A1 7/2020 Blackman
2020/0250174 A1 8/2020 Padmanabhan et al.
2020/0250176 A1 8/2020 Padmanabhan
2020/0250177 A1 8/2020 Padmanabhan
2020/0250295 A1 8/2020 Padmanabhan
2020/0250661 A1 8/2020 Padmanabhan et al.
2020/0250683 A1 8/2020 Padmanabhan et al.
2020/0250747 A1 8/2020 Padmanabhan
2020/0252205 A1 8/2020 Padmanabhan
2020/0252404 A1 8/2020 Padmanabhan
2020/0252406 A1 8/2020 Padmanabhan et al.
2020/0280440 A1 9/2020 Bollen
2020/0285507 A1 9/2020 Qiu
2020/0287718 A1 9/2020 Hildebrand et al.
2020/0287719 A1* 9/2020 Hildebrand ............. H04L 63/12
2020/0293500 A1* 9/2020 Patil ...................... H04L 9/3239
2020/0294165 A1 9/2020 Yang
2020/0320529 A1* 10/2020 Lyadvinsky .......... H04L 9/3239
2020/0328899 A1 10/2020 Glickshtein
2020/0334752 A1 10/2020 Doney
2020/0336475 A1 10/2020 Padmanabhan
2020/0344132 A1 10/2020 Padmanabhan
2020/0349142 A1 11/2020 Padmanabhan
2020/0349564 A1 11/2020 Padmanabhan et al.
2020/0357084 A1 11/2020 Lerato Hunn
2020/0364703 A1 11/2020 Joveski
2020/0371995 A1 11/2020 Padmanabhan
2020/0374105 A1 11/2020 Padmanabhan
2020/0374106 A1 11/2020 Padmanabhan
2020/0380624 A1 12/2020 Turgman
2021/0042746 A1* 2/2021 Westland ........... G06Q 20/3827
2021/0073647 A1 3/2021 Hunter
2021/0090108 A1 3/2021 Moreno Molina
2021/0097528 A1 4/2021 Wang
2021/0097795 A1* 4/2021 Manchovski ......... H04L 63/108
2021/0117938 A1* 4/2021 Arora ..................... G06Q 20/02
2021/0133700 A1 5/2021 Williams
2021/0143982 A1 5/2021 Shah
2021/0150610 A1 5/2021 Mao
2021/0150626 A1 5/2021 Robotham
2021/0152535 A1 5/2021 Padmanabhan
2021/0152536 A1 5/2021 Padmanabhan
2021/0158449 A1 5/2021 Tulsi
2021/0166231 A1 6/2021 Han
2021/0182272 A1* 6/2021 Shpurov ............. G06F 16/2365
2021/0182423 A1 6/2021 Padmanabhan
2021/0182773 A1 6/2021 Padmanabhan
2021/0182806 A1 6/2021 Ornelas
2021/0192652 A1 6/2021 Blaikie, III
2021/0192852 A1 6/2021 Holmes
2021/0217001 A1* 7/2021 Harrison ............. G06F 21/6218
2021/0226774 A1 7/2021 Padmanabhan
2021/0240498 A1 8/2021 Padmanabhan
2021/0243193 A1 8/2021 Padmanabhan
2021/0273814 A1 9/2021 Lee
2021/0295320 A1* 9/2021 Yan ........................ G06Q 20/40
2021/0320847 A1* 10/2021 Altshuler ............ H04L 41/0893
2021/0342329 A1 11/2021 Padmanabhan
2021/0357893 A1 11/2021 Kang
2021/0357927 A1* 11/2021 Kita ................. G06Q 20/38215
2021/0366586 A1 11/2021 Ryan
2021/0373878 A1 12/2021 Padmanabhan
2021/0374731 A1 12/2021 Kim
2021/0374759 A1 12/2021 Padmanabhan
2021/0377028 A1 12/2021 Doney
2021/0382966 A1 12/2021 Shii
2021/0385087 A1 12/2021 Hildebrand
2021/0397604 A1 12/2021 Padmanabhan
2022/0006705 A1 1/2022 Padmanabhan
2022/0019575 A1 1/2022 Qian
2022/0027041 A1 1/2022 Everitt
2022/0027356 A1 1/2022 Padmanabhan
2022/0027992 A1* 1/2022 Blevins ................. H04L 9/3247
2022/0058633 A1 2/2022 Yantis
2022/0069977 A1 3/2022 Manevich
2022/0076246 A1 3/2022 Griffin
2022/0076334 A1 3/2022 Filter
2022/0094549 A1 3/2022 Moreno
2022/0094554 A1 3/2022 Sekar
2022/0101316 A1 3/2022 Cramer
2022/0114238 A1 4/2022 Padmanabhan
2022/0114584 A1 4/2022 Conley
2022/0116214 A1 4/2022 Jentzsch
2022/0129064 A1 4/2022 Gueye
2022/0129475 A1* 4/2022 Thaw .................... H04L 9/3247
2022/0147988 A1 5/2022 Alexa
2022/0173893 A1 6/2022 Basu
2022/0180432 A1 6/2022 Menon
2022/0188818 A1 6/2022 Roche
2022/0198559 A1 6/2022 Dalton
2022/0210061 A1 6/2022 Simu
2022/0245560 A1 8/2022 Dhaliwal
2022/0248165 A1 8/2022 Dhaliwal
2022/0253836 A1 8/2022 Russell
2022/0271915 A1 8/2022 Turner
2022/0276996 A1* 9/2022 Gaur .................... G06Q 20/401
2022/0284008 A1 9/2022 Treitlinger
2022/0300487 A1* 9/2022 Wright ................... G06Q 20/02
2022/0300950 A1 9/2022 Yakovlev
2022/0300966 A1 9/2022 Andon
2022/0303141 A1 9/2022 Branton
2022/0311611 A1 9/2022 Gaur
2022/0327225 A1* 10/2022 Lyren .................... G06F 21/125
2022/0343250 A1 10/2022 Tremblay
2022/0351186 A1 11/2022 Quigley
2022/0358450 A1* 11/2022 Stephens ................. A63F 13/79
2022/0358462 A1 11/2022 Oldfield
2022/0358580 A1 11/2022 Sliwka
2022/0365632 A1 11/2022 Preston
2022/0391887 A1 12/2022 Jakobsson
2022/0391895 A1 12/2022 Weber
2022/0398538 A1 12/2022 Jakobsson
2022/0405747 A1* 12/2022 Coughlan .......... G06Q 30/0283
2022/0414621 A1 12/2022 Parlotto
2022/0414665 A1 12/2022 Gelda
2022/0414809 A1 12/2022 Geng
2023/0006976 A1 1/2023 Jakobsson
2023/0011621 A1 1/2023 Jakobsson
2023/0038714 A1 2/2023 Padmanabhan
2023/0070586 A1 3/2023 Kapur
2023/0080808 A1 3/2023 Padmanabhan
2023/0080927 A1 3/2023 Padmanabhan

(56) References Cited

U.S. PATENT DOCUMENTS

| | | | | |
|---|---|---|---|---|
| 2023/0081152 | A1 | 3/2023 | Blazevige | |
| 2023/0085481 | A1 | 3/2023 | Padmanabhan | |
| 2023/0105132 | A1 | 4/2023 | White | |
| 2023/0126016 | A1 | 4/2023 | Nelson | |
| 2023/0137653 | A1 | 5/2023 | Dresselhuys | |
| 2023/0143854 | A1 | 5/2023 | Venezia | |
| 2023/0169498 | A1 | 6/2023 | Sado | |
| 2023/0206329 | A1 | 6/2023 | Cella | |
| 2023/0230054 | A1 | 7/2023 | Livesay | |
| 2023/0267456 | A1 | 8/2023 | Garner | |
| 2023/0274244 | A1 | 8/2023 | Quigley | |
| 2023/0274270 | A1 | 8/2023 | Marty | |
| 2023/0291544 | A1 | 9/2023 | Turner | |
| 2023/0298010 | A1 | 9/2023 | Lee | |
| 2023/0385819 | A1 | 11/2023 | Al Suwailem | |
| 2023/0390627 | A1 | 12/2023 | Bolton | |
| 2023/0410128 | A1 | 12/2023 | Liao | |
| 2023/0412385 | A1* | 12/2023 | Ohashi | H04L 9/40 |
| 2024/0005038 | A1 | 1/2024 | Yuan | |
| 2024/0046249 | A1 | 2/2024 | Chung | |
| 2024/0062280 | A1 | 2/2024 | Sathe | |
| 2024/0275611 | A1 | 8/2024 | Molloy | |

FOREIGN PATENT DOCUMENTS

| | | | |
|---|---|---|---|
| AU | 2019345041 | A1 | 4/2021 |
| AU | 2020351764 | A1 | 4/2022 |
| CN | 101258483 | | 9/2008 |
| CN | 103118053 | | 5/2013 |
| CN | 106453435 | | 2/2017 |
| CN | 106651346 | | 5/2017 |
| CN | 106815728 | A | 6/2017 |
| CN | 107124403 | A | 9/2017 |
| CN | 107360248 | A | 11/2017 |
| CN | 107391944 | | 11/2017 |
| CN | 107450981 | A | 12/2017 |
| CN | 108021986 | A | 5/2018 |
| CN | 109173261 | A | 1/2019 |
| CN | 111242620 | A | 6/2020 |
| CN | 111902810 | A | 11/2020 |
| CN | 111919417 | A | 11/2020 |
| CN | 113039568 | A | 6/2021 |
| CN | 113056760 | A | 6/2021 |
| EP | 3557511 | A1 | 10/2019 |
| EP | 3747153 | A1 | 12/2020 |
| EP | 3776255 | A1 | 2/2021 |
| EP | 3853794 | A1 | 7/2021 |
| JP | 2005148796 | | 6/2005 |
| JP | 2017187777 | | 10/2017 |
| JP | 2018537022 | | 12/2018 |
| JP | 2021512416 | A | 5/2021 |
| WO | 2016161073 | A1 | 10/2016 |
| WO | 2018007827 | A1 | 1/2018 |
| WO | 2018007828 | A2 | 1/2018 |
| WO | 2018090331 | A1 | 5/2018 |
| WO | 2018109010 | | 6/2018 |
| WO | 2018181073 | A1 | 10/2018 |
| WO | 2018194707 | A1 | 10/2018 |
| WO | 2018230581 | A1 | 12/2018 |
| WO | 2019152750 | A1 | 8/2019 |
| WO | 2019190855 | A1 | 10/2019 |
| WO | 2019241071 | A1 | 12/2019 |
| WO | 2020061224 | A1 | 3/2020 |
| WO | 2020061225 | A1 | 3/2020 |
| WO | 2020061226 | A1 | 3/2020 |
| WO | 2020092900 | A2 | 5/2020 |
| WO | 2020160109 | A1 | 8/2020 |
| WO | 2020234814 | A1 | 11/2020 |
| WO | 2021116950 | A1 | 6/2021 |
| WO | 2021136696 | A1 | 7/2021 |
| WO | 2021243043 | A1 | 12/2021 |
| WO | 2021250045 | A1 | 12/2021 |
| WO | 2022204404 | A1 | 9/2022 |

OTHER PUBLICATIONS

Padmanabhan, Prithvi Krishnan, "Database System Public Trust Ledger Architecture", U.S. Appl. No. 17/410,376, filed Aug. 24, 2021.

Padmanabhan, Prithvi Krishnan, "Database System Public Trust Ledger Contract Linkage", U.S. Appl. No. 17/412,056, filed Aug. 25, 2021.

Padmanabhan, Prithvi Krishnan, "Database System Public Trust Ledger Multi-Owner Token Architecture", U.S. Appl. No. 17/517,543, filed Nov. 2, 2021.

Padmanabhan, Prithvi Krishnan, "Database System Public Trust Ledger Token Creation and Exchange", U.S. Appl. No. 17/517,522, filed Nov. 2, 2021.

Padmanabhan, Prithvi Krishnan, "Database System Public Trust Token Redeem Architecture Using Wallets", U.S. Appl. No. 17/517,541, filed Nov. 2, 2021.

U.S. App. No. 17/410,932, filed Aug. 24, 2021, Hildebrand Hal Scott.

U.S. App. No. 17/648,862, filed Jan. 25, 2022, Padmanabhan Prithvi Krishnan.

U.S. App. No. 17/648,865, filed Jan. 25, 2022, Padmanabhan Prithvi Krishnan.

U.S. Appl. No. 16/294,646, Corrected Notice of Allowance mailed Jun. 30, 2021, 11 pgs.

U.S. Appl. No. 16/294,646, Examiner Interview Summary mailed Mar. 29, 2021, 3 pgs.

U.S. Appl. No. 16/294,646, Examiner Interview Summary mailed May 28, 2021, 2 pgs.

U.S. Appl. No. 16/294,646, Examiner Interview Summary mailed Jun. 30, 2021, 1 pg.

U.S. Appl. No. 16/294,646, Non-Final Office Action mailed Feb. 22, 2021, 23 pgs.

U.S. Appl. No. 16/294,646, Notice of Allowance mailed May 28, 2021, 13 pgs.

U.S. Appl. No. 16/294,654, Corrected Notice of Allowance mailed Jun. 30, 2021, 10 pgs.

U.S. Appl. No. 16/294,654, Examiner Interview Summary mailed Mar. 29, 2021, 2 pgs.

U.S. Appl. No. 16/294,654, Examiner Interview Summary mailed Jun. 1, 2021, 1 pg.

U.S. Appl. No. 16/294,654, Examiner Interview Summary mailed Jun. 30, 2021, 1 pg.

U.S. Appl. No. 16/294,654, Non-Final Office Action mailed Feb. 22, 2021, 26 pgs.

U.S. Appl. No. 16/294,654, Notice of Allowance mailed Jun. 1, 2021, 13 pgs.

Padmanabhan, Prithvi Krishnan, "Database System Public Trust Ledger Architecture", U.S. Appl. No. 17/410,366, filed Aug. 24, 2021.

Notice of Allowance dated May 11, 2023 for U.S. Appl. No. 17/648,865 (pp. 1-12).

Office Action (Final Rejection) dated Jun. 21, 2023 for U.S. Appl. No. 17/410,376 (pp. 1-30).

Office Action (Non-Final Rejection) dated Mar. 2, 2023 for U.S. Appl. No. 17/410,376 (pp. 1-26).

Office Action (Non-Final Rejection) dated May 24, 2023 for U.S. Appl. No. 17/517,522 (pp. 1-13).

Office Action (Non-Final Rejection) dated May 31, 2023 for U.S. Appl. No. 17/412,059 (pp. 1-13).

Office Action (Non-Final Rejection) dated Jul. 11, 2023 for U.S. Appl. No. 17/412,056 (pp. 1-16).

Office Action (Non-Final Rejection) dated Jul. 26, 2023 for U.S. Appl. No. 17/517,543 (pp. 1-23).

Office Action (Notice of Allowance and Fees Due (PTOL-85)) dated Jul. 27, 2023 for U.S. Appl. No. 17/412,059 (pp. 1-8).

Office Action dated Mar. 6, 2023 for U.S. Appl. No. 17/517,541 (pp. 1-28).

Notice of Allowance dated Mar. 20, 2024 for U.S. Appl. No. 17/517,522 (pp. 1-11).

Notice of Allowance dated Oct. 20, 2023 for U.S. Appl. No. 17/662,812 (pp. 1-8).

(56) References Cited

OTHER PUBLICATIONS

Office Action (Final Rejection) dated Apr. 25, 2024 for U.S. Appl. No. 17/662,810 (pp. 1-31).
Office Action (Final Rejection) dated Jul. 30, 2024 for U.S. Appl. No. 17/662,795 (pp. 1-18).
Office Action (Final Rejection) dated Oct. 24, 2023 for U.S. Appl. No. 17/412,056 (pp. 1-17).
Office Action (Final Rejection) dated Nov. 20, 2023 for U.S. Appl. No. 17/517,522 (pp. 1-15).
Office Action (Non-Final Rejection) dated Feb. 8, 2024 for U.S. Appl. No. 17/662,795 (pp. 1-18).
Office Action (Non-Final Rejection) dated May 16, 2024 for U.S. Appl. No. 17/662,804 (pp. 1-15).
Office Action (Non-Final Rejection) dated Sep. 14, 2023 for U.S. Appl. No. 17/410,376 (pp. 1-29).
Office Action (Non-Final Rejection) dated Oct. 26, 2023 for U.S. Appl. No. 17/933,827 (pp. 1-15).
Office Action (Non-Final Rejection) dated Dec. 14, 2023 for U.S. Appl. No. 17/662,810 (pp. 1-15).
Office Action (Notice of Allowance and Fees Due (PTOL-85)) dated Jan. 24, 2024 for U.S. Appl. No. 17/410,376 (pp. 1-9).
Office Action (Notice of Allowance and Fees Due (PTOL-85)) dated Jan. 29, 2024 for U.S. Appl. No. 17/517,543 (pp. 1-14).
Office Action (Notice of Allowance and Fees Due (PTOL-85)) dated Mar. 20, 2024 for U.S. Appl. No. 17/517,522 (pp. 1-10).
Office Action (Notice of Allowance and Fees Due (PTOL-85)) dated May 17, 2024 for U.S. Appl. No. 17/412,056 (pp. 1-9).
Office Action (Notice of Allowance and Fees Due (PTOL-85)) dated Dec. 20, 2023 for U.S. Appl. No. 17/648,862 (pp. 1-14).
Office Action dated Sep. 20, 2023 for U.S. Appl. No. 17/517,541 (pp. 1-24).
Torres et al. A Survey on Identity Management for the Future Network, IEEE, Aug. 20, 2012, pp. 1-16. (Year: 2012).
Zhikui Chen, A Scenario for Identity Management in Daidalos, IEEE, May 1, 2012, pp. 1-8. (Year: 2007).
Salah, K. et al, "Blockchain for AI: Review and Open Research Challenges," IEEE, vol. 7, 2019, 23 pages.
Salesforce, "Force.com Apex Code Developer's Guide," version 34.0, 2015, 1000 pages.
Sandgaard, J., et al., "MedChain White Paper V1.1," (Oct. 1, 2017), Retrieved from the Internet: URLhttps://Www.medchain.global/doc/Medchain%20Whitepaper%20v1.1.pdf, Retrieved on Mar. 21, 2019, 54 pages.
Shukla, A., et al., "Smart Contracts for Multiagent Plan Execution in Untrusted Cyber-physical Systems," 2018 IEEE 25th International Conference on High Performance Computing Workshops (HiPCW), 10 pages.
Using Sawtooth with Docker: Configuring the List of Transaction Families, Apr. 6, 2018, 13 pages.
Wikipedia, "Federate database system," Jun. 8, 2016, https://en.wikipedia.org/w/index.php/?title=Federated%20database%20system&oldid=808166410, 6 pages.
Wikipedia, "Solidity," Feb. 2, 2017, https://web.archive.org/web/20170202023 04/https://en.wikipeida.org/wiki/Solidity (Year: 2017), 3 pages.
Zyskind, G., et al., "Decentralizing Privacy: Using Blockchain to Protect Personal Data," 2015 IEEE Security and Privacy Workshops (May 1, 2015), 5 pages.
U.S. Appl. No. 17/153,872, filed Jan. 20, 2021, Padmanabhan Prithvi Krishnan.
U.S. Appl. No. 17/163,547, filed Jan. 31, 2021, Padmanabhan Prithvi Krishnan.
U.S. Appl. No. 17/348,286, filed Jun. 15, 2021, Padmanabhan Prithvi Krishnan.
U.S. Appl. No. 62/839,462, filed Apr. 26, 2019, Padmanabhan Prithvi Krishnan.
U.S. Appl. No. 62/839,521, filed Apr. 26, 2019, Padmanabhan Prithvi Krishnan.
U.S. Appl. No. 62/839,523, filed Apr. 26, 2019, Padmanabhan Prithvi Krishnan.
U.S. Appl. No. 62/839,525, filed Apr. 26, 2019, Padmanabhan Prithvi Krishnan.
U.S. Appl. No. 62/839,529, filed Apr. 26, 2019, Padmanabhan Prithvi Krishnan.
U.S. Appl. No. 62/839,561, filed Apr. 26, 2019, Padmanabhan Prithvi Krishnan.
U.S. Appl. No. 62/840,074, filed Apr. 26, 2019, Padmanabhan Prithvi Krishnan.
U.S. Appl. No. 62/963,311, filed Apr. 26, 2019, Padmanabhan Prithvi Krishnan.
"A framework for modular norm extraction, modeling and reasoning", Sayonnha Mandal, Jul. 2017 (Year: 2017) 24 pages.
"BigchainDB 2.0 the Blockchain Database," Berlin Germany dated May 2018, 14 pages.
"Deloitte IoT Powered by Blockchain", dated May 2017, 20 pages.
"Ethereum Solidity Available in Visual Studio," PR Newswire, 2016, 3 pages.
"How Creating Digital Twins in Blockchain Will Protect Brands?", dated Nov. 15, 2018, 4 pages.
"Nasdaq, Using Blockchain Track Assets Proof Ownership", dated Nov. 30, 2016, 30 pages.
"Self-aware agent supported contract management on blockchains for legal accountability", Alex Norta, Jun. 2007 (Year: 2007) 42 pages.
Abdellatif et al. Formal verification of smart contracts based on users and blockchain behavior models. Conference Paper ¦ Feb. 2018. DOI: 10.1109/NTMS.2018.8328737. Retrieved via Research Gate on [Sep. 13, 2022]. (Year: 2018) 6 pages.
Alessi etal., "Make users own their data: a decentralized personal data store prototype based on Ethereum and IPFS;" 2018 3rd International Conference on Smart and Sustainable Technologies (SpliTech) (Year: 2018) 7 pages.
Azaria, A., et al. "MedRec: Using Blockchain for Medical Data Access and Permission Management," 2016 2nd Int'l Conference on Open and Big Data, IEEE, (Aug. 22, 2016), pp. 25-30.
Bendor-Samuel, P. (2017) Blockchain-enabled "smart-contracts" solve problems in administering IT ecosystem services, CIO, 3 pages.
Cai et al., "BCSolid: A Blockchain-Based Decentralized Data Storage and Authentication Scheme for Solid;" Springer Nature Singapore Pte Ltd. 2020, Z. Zheng etal. (Eds.): BlockSys 2019, CCIS 1156, pp. 676-689, 2020. (Year: 2020).
Duan, Z. et ai., "Formal Modeling and Verifcation of Bicckchain System," in Proceedings of the 10th International Conference on Computer Modeling and Simulation (ICCivIS '18). Association tor Computing Machinery, New York, NY, USA, 231-235, 2018.
Final Office Action for U.S. Appl. No. 15/885,803 dated Nov. 17, 2021, 28 pages.
Final Office Action for U.S. Appl. No. 15/885,811, dated Feb. 3, 2022, 38 pages.
Final Office Action for U.S. Appl. No. 15/932,092 dated Sep. 27, 2021, 25 pages.
Final Office Action for U.S. Appl. No. 15/932,099 dated Nov. 1, 2021, 35 pages.
Final Office Action for U.S. Appl. No. 16/264,645, dated Aug. 8, 2022, 72 pages.
Final Office Action for U.S. Appl. No. 16/399,913, dated Aug. 2, 2022, 76 pages.
Final Office Action for U.S. Appl. No. 16/399,920, dated Aug. 1, 2022, 70 pages.
Final Office Action for U.S. Appl. No. 16/776,220, dated Aug. 4, 2022, 37 pages.
Final Office Action for U.S. Appl. No. 15/885,803, dated Jul. 20, 2020, 29 pages.
Final Office Action for U.S. Appl. No. 15/885,811, dated Aug. 5, 2020, 45 pages.
Final Office Action for U.S. Appl. No. 15/932,099 dated Jun. 1, 2020, 27 pages.
Final Office Action for U.S. Appl. No. 16/177,305 dated Feb. 2, 2021, 47 pages.
Final Office Action for U.S. Appl. No. 16/264,657 dated May 17, 2021, 36 pages.

(56) References Cited

OTHER PUBLICATIONS

Genestier, P., et al., "Blockchain for Consent Management in the eHealth Environment: A Nugget for Privacy and Security Challenges," Journal of the Int'l Society for Telemedicine and eHealth, (Jan. 1, 2017), 4 pages.
Hu, Y.C. et si, "Analyzing smart contract interactions and contract level state consensus," Concurrency and Compulation: Practice and Experience 32, 2020, 17 pages.
Imen Riabi et al., Blockchain Based OAuth for IoT, Nov. 23, 2021, IEEE, pp. 1-7 (Year: 2021).
International Search Report and Written Opinion for Application No. PCT/US2019/036103, dated Aug. 1, 2019, 12 pages.
International Search Report and Written Opinion for Application No. PCT/US2020/015618 dated May 11, 2020, 13 pages.
International Search Report and Written Opinion for International Patent Application No. PCT/US2019/016199, dated Apr. 2, 2019, 12 pages.
Jackson, "Understanding the Implication of Blockchain Technology on the Audit Profession;" 2018, Honors Undergraduate Theses; 421; https://stars.library.ucf.edu/honorstheses/421 (Year: 2018).
Kalra. S. et al, "ZEUS: Analyzing Safety of Smart Contracts," In Ndss Feb. 18, 2018, pp. 1-12.
M. G. Z. Fernando, A. M. Sison and R. P. Medina, "Securing Private Key using New Transposition Cipher Technique," 2019 IEEE Eurasia Conference on IOT, Communication and Engineering (ECICE), Yunlin, Taiwan, 2019, pp. 490-493, doi: 10.1109/ ECICE47484.2019.8942798 (Year: 2019).
Mandal, S., "A Framework for Modular Norm Extraction, Modeling, and Reasoning," [Doctoral dissertation, University of Nebraska], 2017, 151 pages, ProQuest Dissertations Publishing.
Mao et al. Visual and User-Defined Smart Contract Designing System Based on Automatic Coding. © 2019 IEEE Access. vol. 7, 2019. DOI: 10.1109/Access.2019.2920776. 13 pages (Year: 2019).
McConaghy et al., "BigchainDB: A Scalable Blockchain Database (DRAFT)" dated Jun. 8, 2016, 64 pages.
Non-final Office Action for U.S. Appl. No. 15/885,803 dated May 10, 2022, 36 pages.
Non-final Office Action for U.S. Appl. No. 15/885,811, dated Aug. 10, 2022, 52 pages.
Non-final Office Action for U.S. Appl. No. 15/932,092, dated Apr. 26, 2022, 42 pages.
Non-final Office Action for U.S. Appl. No. 16/399,920, dated Feb. 17, 2022, 66 pages.
Non-final Office Action for U.S. Appl. No. 16/776,220 dated Mar. 17, 2022, 56 pages.
Non-final Office Action for U.S. Appl. No. 16/776,236, dated Apr. 1, 2022, 66 pages.
Non-final Office Action for U.S. Appl. No. 16/777,073 dated Jul. 20, 2022, 88 pages.
Non-final Office Action for U.S. Appl. No. 16/777,107, dated Jun. 7, 2022, 68 pages.
Non-final Office Action for U.S. Appl. No. 16/777,141, dated Jul. 29, 2022, 68 pages.
Non-final Office Action for U.S. Appl. No. 16/777,409 dated Oct. 4, 2021, 42 pages.
Non-final Office Action for U.S. Appl. No. 16/778,628, dated Apr. 27, 2022, 55 pages.
Non-final Office Action for U.S. Appl. No. 16/917,506, dated Oct. 4, 2021, 44 pages.
Non-final Office Action received for U.S. Appl. No. 17/348,286, dated Sep. 23, 2022, 82 pages.
Normans Media Ltd., Smart Contracts: Blockchain-based contracts that don't require lawyers. 2016, 4 pages.
Notice of Allowance dated Jul. 29, 2025 for U.S. Appl. No. 17/662,804 (pp. 1-14).
Notice of Allowance for U.S. Appl. No. 17/157,997, dated Oct. 13, 2022, 67 pages.
Notice of Allowance for U.S. Appl. No. 15/940,646, dated Oct. 31, 2019, 8 pages.
Notice of Allowance for U.S. Appl. No. 16/177,300, dated Oct. 6, 2021, 14 pages.
Notice of Allowance for U.S. Appl. No. 16/177,305, dated Sep. 21, 2022, 15 pages.
Notice of Allowance for U.S. Appl. No. 16/264,653 dated Jun. 7, 2021, 21 pages.
Notice of Allowance for U.S. Appl. No. 16/264,653 dated Sep. 29, 2021, 17 pages.
Notice of Allowance for U.S. Appl. No. 16/264,657, dated Jun. 20, 2022, 32 pages.
Notice of Allowance for U.S. Appl. No. 16/683,932 dated Dec. 3, 2021, 9 pages.
Notice of Allowance for U.S. Appl. No. 16/777,409 dated Apr. 14, 2022, 16 pages.
Notice of Allowance for U.S. Appl. No. 15/932,100 dated Feb. 20, 2020, 5 pages.
Notice of allowance for U.S. Appl. No. 16/264,653 dated Nov. 23, 2020, 16 pages.
Notice of Allowance for U.S. Appl. No. 16/683,945, dated Feb. 10, 2021, 14 pages.
O'Neill.,"How Smart Certificates of Authenticity Improve Asset Management", Jan. 17, 2019, 4 pages.
Office Action (Final Rejection) dated Feb. 3, 2025 for U.S. Appl. No. 18/302,672 (pp. 1-15).
Office Action (Final Rejection) dated Mar. 3, 2025 for U.S. Appl. No. 18/060,471 (pp. 1-15).
Office Action (Final Rejection) dated Jun. 3, 2025 for U.S. Appl. No. 17/662,795 (pp. 1-23).
Office Action (Final Rejection) dated Sep. 11, 2025 for U.S. Appl. No. 18/158,702 (pp. 1-30).
Office Action (Final Rejection) dated Sep. 25, 2025 for U.S. Appl. No. 18/327,234 (pp. 1-33).
Office Action (Final Rejection) dated Dec. 19, 2024 for U.S. Appl. No. 17/662,804 (pp. 1-11).
Office Action (Non-Final Rejection) dated Jan. 24, 2025 for U.S. Appl. No. 18/158,702 (pp. 1-26).
Office Action (Non-Final Rejection) dated Mar. 20, 2025 for U.S. Appl. No. 18/327,234 (pp. 1-25).
Office Action (Non-Final Rejection) dated Aug. 27, 2024 for U.S. Appl. No. 18/302,672 (pp. 1-31).
Office Action (Non-Final Rejection) dated Oct. 15, 2025 for U.S. Appl. No. 18/315,830 (pp. 1-7).
Office Action (Notice of Allowance and Fees Due (PTOL-85)) dated Apr. 7, 2025 for U.S. Appl. No. 18/153,280 (pp. 1-16).
Office Action (Notice of Allowance and Fees Due (PTOL-85)) dated Apr. 22, 2025 for U.S. Appl. No. 18/648,183 (pp. 1-9).
Office Action (Notice of Allowance and Fees Due (PTOL-85)) dated Jul. 29, 2025 for U.S. Appl. No. 17/662,804 (pp. 1-13).
Office Action (Notice of Allowance and Fees Due (PTOL-85)) dated Aug. 27, 2025 for U.S. Appl. No. 18/302,672 (pp. 1-13).
Office Action (Notice of Allowance and Fees Due (PTOL-85)) dated Sep. 30, 2025 for U.S. Appl. No. 18/060,471 (pp. 1-9).
Office Action for U.S. Appl. No. 15/885,803 dated Jan. 8, 2020, 47 pages.
Office Action for U.S. Appl. No. 15/885,803, dated Apr. 14, 2021, 31 pages.
Office Action for U.S. Appl. No. 15/885,811 dated Aug. 4, 2021, 26 pages.
Office Action for U.S. Appl. No. 15/932,092 dated Jan. 22, 2020, 36 pages.
Office Action for U.S. Appl. No. 15/932,100, dated Nov. 8, 2019, 9 pages.
Office Action for U.S. Appl. No. 15/940,646, dated Apr. 29, 2019, 7 pages.
Office Action for U.S. Appl. No. 16/177,300 dated Jun. 16, 2021, 80 pages.
Office Action for U.S. Appl. No. 16/177,305 dated Sep. 16, 2021 42 pages.
Office Action for U.S. Appl. No. 16/264,645 dated Oct. 27, 2021, 46 pages.
Office Action for U.S. Appl. No. 16/399,913, dated Dec. 24, 2021 51 pages.

(56) References Cited

OTHER PUBLICATIONS

Office Action for U.S. Appl. No. 16/683,945, dated Sep. 14, 2020, 18 pages.
Office Action for EP Application No. 19707168.1 dated Sep. 24, 2020, 3 pages.
Office Action for U.S. Appl. No. 15/885,811 dated Jan. 17, 2020, 40 pages.
Office Action for U.S. Appl. No. 15/932,092 dated Mar. 17, 2021, 23 pages.
Office Action for U.S. Appl. No. 15/932,099, dated Oct. 3, 2019, 26 pages.
Office Action for U.S. Appl. No. 16/177,305 dated Jul. 23, 2020, 41 pages.
Office Action for U.S. Appl. No. 16/264,657, dated Sep. 18, 2020, 33 pages.
Ojha, "Chaincode for Go Developers, Part 1: Writing Blockchain Chaincode in Go for Hyperledger Fabric v0.6," 2017, 15 pages.
Peterson, K., et al, "A Blockchain-Based Approach to Health Information Exchange Networks," (Aug. 8, 2016), Retrieved from the Internet: URL: http://kddlab.zjgsu.edu.cn:7200/research/blockchain/huyiyang-reference/A%20Blockchain-Based%20Approach%20to%20Health%20Information%20Exchange.pdf, Retrieved on Mar. 21, 2019), 10 Pages.
Office Action (Non-Final Rejection) dated Sep. 18, 2024 for U.S. Appl. No. 18/153,280 (pp. 1-21).
Office Action (Non-Final Rejection) dated Sep. 27, 2024 for U.S. Appl. No. 18/060,471 (pp. 1-13).
Office Action (Non-Final Rejection) dated Nov. 6, 2024 for U.S. Appl. No. 17/662,795 (pp. 1-28).
Office Action (Non-Final Rejection) dated Nov. 21, 2024 for U.S. Appl. No. 17/662,810 (pp. 1-18).

* cited by examiner

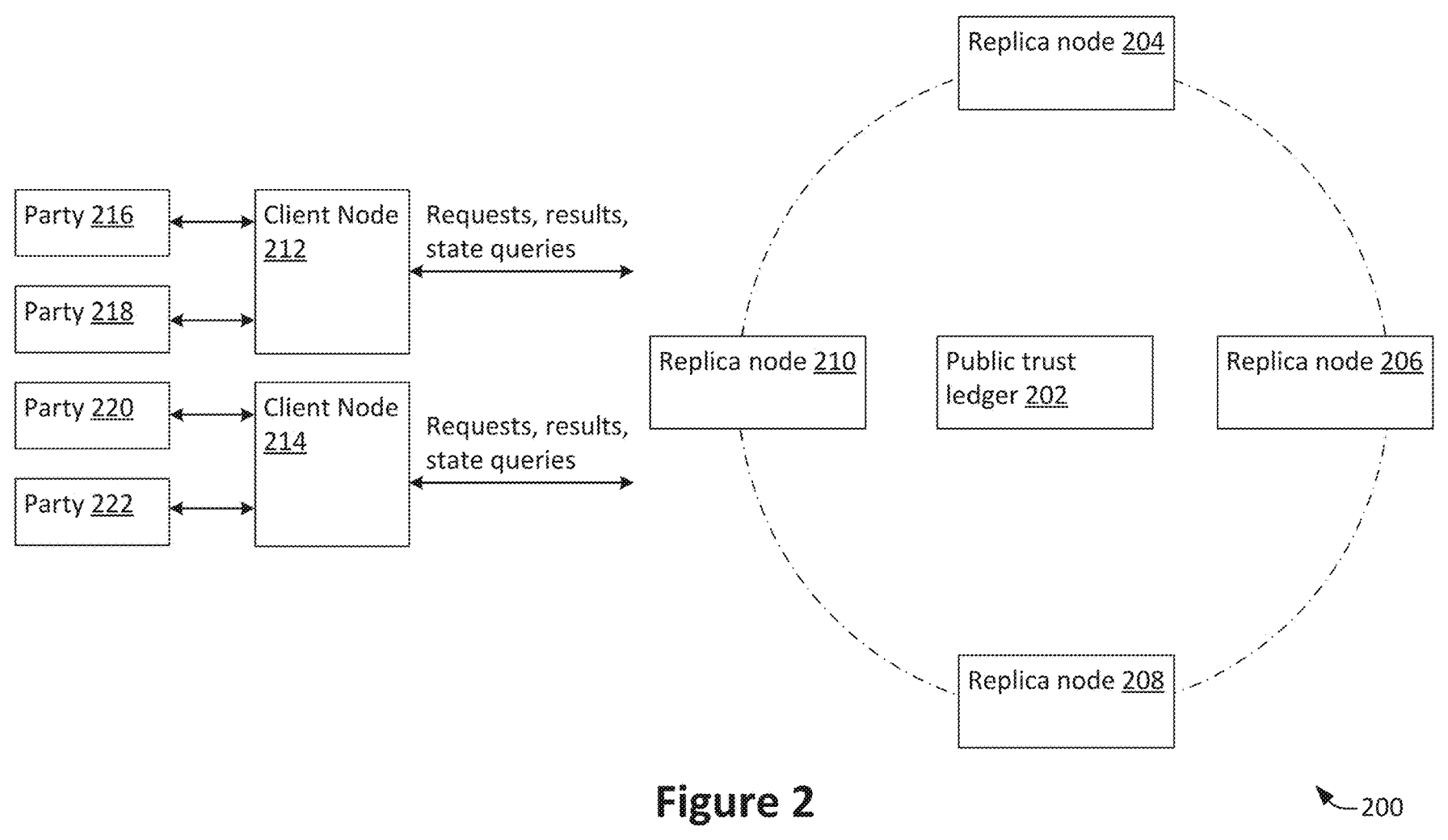

Replica node 206

200

Replica node 204

Public trust ledger 202

Replica node 208

Replica node 210

Figure 2

Requests, results, state queries

Requests, results, state queries

Client Node 212

Client Node 214

Party 216

Party 218

Party 220

Party 222

Figure 5

Entity 1102
Database System 702
Wallet API 704
Ledger API 706
1100
Purchase Request
1104
Authenticate
1106
Request Buyer Party JWT
1108
Buyer Party JWT
1110
Request Exchange Services
1112
Exchange Request Successful
1114
Request Seller Party JWT
1116
Buyer Seller JWT
1118
Deposit Receipt
1120
Deposit Successful
1122
Perform Exchange
1124
Exchange Successful
1126
Asset Account ID Updated
1128
Asset Transaction Log Status Updated
1130

DATABASE SYSTEM PUBLIC TRUST LEDGER ARCHITECTURE

CROSS-REFERENCE TO RELATED APPLICATIONS

This application claims priority to U.S. Patent App. No. 63/230,293 by Prithvi Krishnan Padmanabhan, filed Aug. 6, 2021, titled "DATABASE SYSTEM PUBLIC TRUST LEDGER ARCHITECTURE", which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to database systems and more specifically to interactions between database systems and public trust ledgers.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Another mechanism for storing information is a public trust ledger, such as a blockchain. A public trust ledger is a distributed repository in which transactions are recorded. Transactions can be monetary, such as recording a payment, or non-monetary, such as recording a transfer of ownership. A public trust ledger is a distributed repository that is publicly accessible and that is secured based on cryptographic protocols.

Cloud computing systems provide platforms for a variety of computing operations. However, a cloud computing environment is typically controlled by a service provider that supervises and governs the environment. A public trust ledger does not depend on a trusted party to manage it, but does not provide a platform for many of the types of operations performed within a cloud computing system. Accordingly, improved techniques for transaction management are desired.

BRIEF DESCRIPTION OF THE DRAWINGS

The included drawings are for illustrative purposes and serve only to provide examples of possible structures and operations for the disclosed inventive systems, apparatus, methods and computer program products for database system digital asset creation and transfer. These drawings in no way limit any changes in form and detail that may be made by one skilled in the art without departing from the spirit and scope of the disclosed implementations.

FIG. 2 illustrates an ecosystem facilitating interactions between a database system and a public trust ledger, configured in accordance with one or more embodiments.

FIG. 5 illustrates an example of a smart contract, configured in accordance with one or more embodiments.

DETAILED DESCRIPTION

Figure 1:
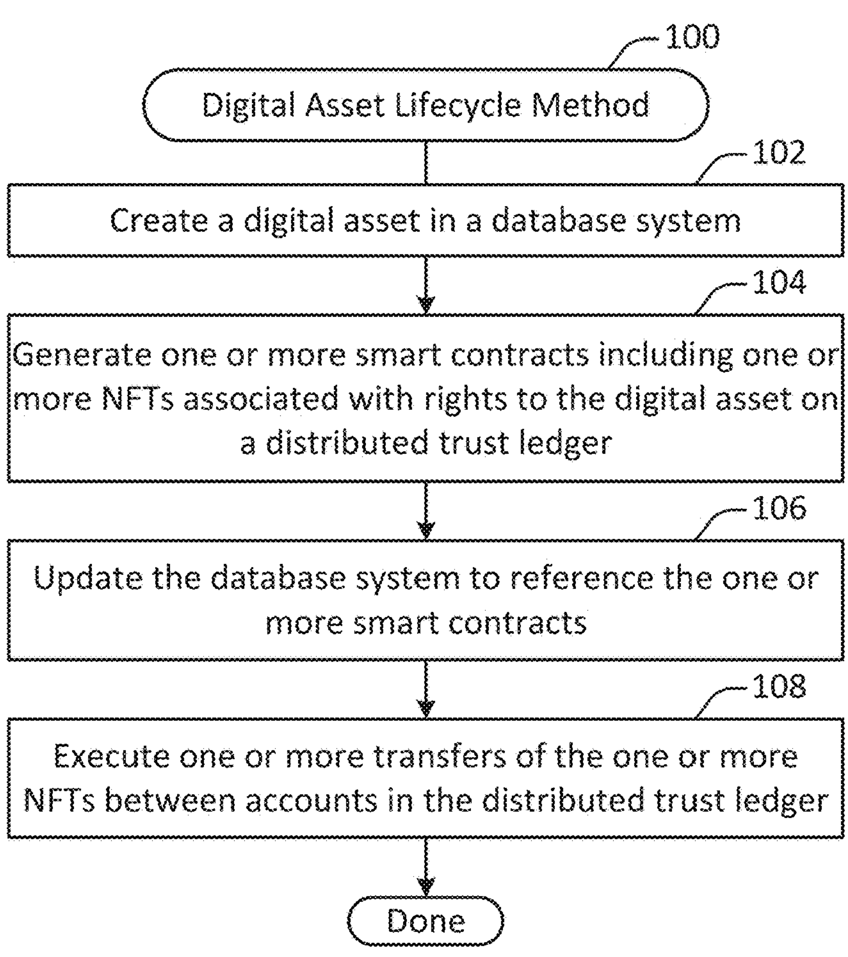
FIG. 1 illustrates an example of a digital asset lifecycle method, performed in accordance with one or more embodiments.

Techniques and mechanisms described herein relate to interactions between an on-demand database system and a public trust ledger such as a blockchain. A digital asset referenced within the on-demand database system may be created and owned by an entity within the on-demand database system. The ownership relationship may then be recorded in the public trust ledger. If and when the ownership of the digital asset changes, for instance due to a purchase, the transaction may also be recorded in the public trust ledger. Moreover, the public trust ledger may be used to record transactions transferring types of rights other than ownership, such as transfers of copyrights, usage rights, control rights, modification rights, and the like.

An on-demand database system allows entities to store information such as records of transactions. However, in conventional systems, an on-demand database system is typically controlled by a service provider, requiring parties to a transaction recorded in the on-demand database system to trust that the service provider will continue to exist, will maintain an adequate level of security, will not permit the transaction record to be lost or corrupted, and will generally behave in a trustworthy manner.

Techniques and mechanisms described herein provide for interactions between an on-demand database system and a public trust ledger. A public trust ledger provides a way to record transactions in a manner that is secure, publicly verifiable, and free from control of any one entity. For instance, the database system may interact with the public trust ledger to record transactions related to the creation and transfer of ownership and other rights in digital assets referenced within the on-demand database system. The public trust ledger may then serve as a source of truth that it is independent of the service provider. A trust ledger may be variously referred to herein as a public trust ledger or a distributed trust ledger.

Consider the example of Alexandra, an asset manager for an apparel company "Acme" accessing computing services via the on-demand database system. Alexandra would like to create digital versions of the company's apparel products for use in digital environments, such as in conjunction with virtual avatars. Although non-fungible tokens (NFTs) have been used for the creation of digital assets, such tokens typically need to be created individually when using conventional systems and techniques. Further, when using conventional systems and techniques, such assets are not connected to Acme's customer relations management (CRM) systems, inventory management systems, and other such systems within the on-demand database system. Further, under a conventional approach, the copyright and other rights on those digital assets remains with Acme, which has no convenient way to manage and transfer individual rights associated with many digital assets.

In contrast, using techniques and mechanisms described herein, Alexandra may automatically create many different digital assets from within the on-demand database system. For example, Alexandra may use a template to create many different digital versions of a shoe, each having a unique color combination. Then, a non-fungible token recorded in a smart contract within a public trust ledger may be automatically created for each of the digital assets. The public trust ledger may be used to record ownership transfers of the digital assets in a way that is secure, publicly verifiable, and outside the control of the on-demand database system service provider. Alexandra is also provided with the option to allow for the transfer rights other than ownership, such as copyrights or modification rights.

According to various embodiments, techniques and mechanisms described herein may facilitate the creation of non-fungible tokens. For instance, an entity accessing services via the on-demand computing services environment can easily and dynamically create any number of non-fungible tokens corresponding with digital assets such as avatars, apparel, characters, promotional material, or any other digital item.

According to various embodiments, techniques and mechanisms described herein provide support for enterprise-level cryptocurrency. For example, an enterprise service provider that provides an on-demand computing services environment may support an enterprise-level cryptocurrency that may be used across the on-demand computing services environment. Entities accessing computing services via the on-demand computing services environment may employ the cryptocurrency to make transactions with the service provider, with each other, and with entities outside of the service environment. As another example, an entity accessing the on-demand computing services environment may create an entity-specific cryptocurrency, such as a branded token, loyalty point token, or other type of fungible token. That entity may then employ the fungible token to provide incentives, support payments within an ecosystem, or facilitate other types of transactions.

In particular embodiments, the service provider may create a particular amount of an enterprise-level cryptocurrency associated with the on-demand computing services environment, such as 10 billion tokens. That enterprise-level cryptocurrency may then be issued to or distributed among consumers, which may include, but are not limited to, business organizations and individual users accessing computing services via the on-demand computing services. For example, the enterprise-level cryptocurrency may be used to provide incentives for behavior. In some configurations, a business organization may extend or rebrand the enterprise-level cryptocurrency to create an organizations-specific cryptocurrency that nevertheless interoperates with the enterprise-level cryptocurrency.

In particular embodiments, business organizations may create their own cryptocurrency or other fungible or non-fungible tokens within the on-demand computing services environment. For instance, such tokens may be branded with a brand associated with a particular business organization. Such tokens may then be used for any suitable purpose, such as being awarded to consumers for use in loyalty, reward programs, and/or retail transactions associated with the brand or business organization.

In particular embodiments, cryptocurrency or other fungible or non-fungible tokens may be used across brands and/or organizations. Such usage may facilitate consumer engagement and/or collecting valuable information about consumers. However, because the tokens are associated with the on-demand computing services environment, CRM analytics pertaining to the tokens within the on-demand computing service environment may provide a single source of truth for gathering, analyzing, and interpreting trends in consumer behavior.

According to various embodiments, techniques and mechanisms described herein may provide technical solutions that facilitate a variety of new ways for organizations to interact with customers. For example, an organization may employ branded collectibles represented by digital assets, facilitating expanded community engagement. As another example, an organization may bundle real world and digital experience linked to digital assets. As yet another example, an organization may securely send exclusive codes for benefits such as early access, discounts, VIP tickets, and gift cards. As still another example, an organization may build a loyal base of customers with free or gamified rewards across different use cases.

According to various embodiments, techniques and mechanisms described herein may facilitate the integration of blockchain data with database system data such as customer relations management (CRM) data and analytics. For instance, information stored in a database system, such as CRM data, may be linked with publicly verified information stored in a block chain to provide a combination of control, security, and verifiability. Such linkages may help to support, for instance, partnerships between organizations such as cross-brand partnerships and promotions.

According to various embodiments, techniques and mechanisms described herein may provide for control over transaction costs. For example, high transfer fees for low value assets may hinder the development of a digital marketplace. To avoid such problems, a service provider or other enterprise associated with a digital asset may set a fixed fee for transferring the digital asset. Such fees may be set, for instance, based on the asset type being transferred.

According to various embodiments, techniques and mechanisms described herein may provide for privacy and data rights. For instance, an organization may integrate customer relations management, such as records of transactions with and between customers, into the database system. Information such as transaction records may be publicly verifiable via recordation in the public trust ledger. However, privacy may be maintained be keeping private information, such as personally identifying information, securely stored within the database system.

According to various embodiments, techniques and mechanisms described herein may provide for scalability. Conventional techniques for interacting with public trust ledgers do not support enterprise-level exchange of digital assets. However, techniques and mechanisms described herein provide technological solutions for scaling digital asset exchange to the enterprise level, ensuring that transactions can occur quickly and efficiently even at high transaction throughput levels.

According to various embodiments, techniques and mechanisms described herein provide for smart contracts. In addition to supporting simple tokens, various embodiments can support modeling complex asset classes. For example, smart contracts may include rules governing transactional aspects such as the number of transactions, type of transactions, and identities of parties.

According to various embodiments, techniques and mechanisms described herein provide technological solutions for facilitating interactions between database systems and public trust ledgers such as blockchain. For example, based on these techniques and mechanisms a blockchain may be used to store verification information, while other types of data may be stored in the database system. Such configurations can provide enhanced speed, reduced transaction costs, and improved data security as compared with conventional techniques. For instance, transactions may be publicly verified while at the same time storing data in a way that is consistent with privacy regulations.

As used herein, the terms "database" and "public trust ledger" are distinct. For example, a database system is controlled by a particular database administrator or service provider, whereas a public trust ledger is a peer-to-peer system in which transactions are publicly recorded in a manner that is outside the control of any one particular organization.

FIG. 1 illustrates an example of a digital asset lifecycle method 100, performed in accordance with one or more embodiments. According to various embodiments, the digital asset lifecycle method 100 may be performed on one or more computing devices within an on-demand computing services environment.

A digital asset is created in a database system at 102. According to various embodiments, the digital asset 102 may be any of a wide variety of assets. For instance, the digital asset 102 may be a digital wardrobe item for a digital avatar, a piece of digital artwork, a piece of music, a film, a digital photograph, an item of digital memorabilia, an animation, or any other type of item. In particular configurations, a digital asset 102 may correspond with a physical asset. For instance, a digital asset may be associated with a unique identifier, which is in turn uniquely associated with one or more items in the physical world.

One or more smart contracts including one or more NFTs associated rights to the digital asset are generated on a public trust ledger at 104. The database may be updated at 106 to reference the one or more smart contracts. According to various embodiments, a smart contract may be generated by minting an NFT of a designated token type in the public trust ledger. An NFT and associated smart contract may be used to record and/or transfer any or all of various types of rights. Such rights may include, but are not limited to: ownership of a digital asset, copyright to a digital asset, and a right to modify a digital asset.

One or more transfers of the one or more NFTs between accounts in the public trust ledger are executed at 108. According to various embodiments, the one or more transfers may be recorded by executing the one or more smart contracts created at 104. The transfers may be executed in order to transfer ownership of the digital asset and/or one or more rights related to the digital asset between parties. The database system may then be updated to reflect the executed transfers. An account in the digital trust ledger may be linked with an account in the database system.

FIG. 2 illustrates an ecosystem 200 facilitating interactions between a database system and a public trust ledger, configured in accordance with one or more embodiments. The ecosystem 200 may be used to implement techniques described herein, and may be implemented using one or more devices and systems shown in FIG. 13, FIG. 14A, FIG. 14B, and FIG. 15.

The ecosystem 200 includes a public trust ledger 202. According to various embodiments, the public trust ledger 202 may store information related to digital assets and transactions pertaining to digital assets. The public trust ledger 202 may be cryptographically verifiable. For example, the public trust ledger may employ one or more cryptographic technologies to provide a transparent, immutable, and cryptographically-verifiable log of transactions stored in the database.

In some implementations, the public trust ledger 202 may be configured so as to provide a single, consistent state at any time, allowing requests to continue to be processed despite failures or attacks. Requests to update the global state of the public trust ledger 202 may be implemented in a consistent manner. Such requests may be globally ordered via consensus between nodes.

Replica nodes are shown at 204, 206, 208, and 10. According to various embodiments, each replica node may be implemented via VMware. However, other types of node management tools may be used instead of, or in addition to, VMware. A replica node may process requests to verify or change the state of the public trust ledger 202.

According to various embodiments, the replica nodes may provide Byzantine fault tolerance (BFT). In a Byzantine fault, a component such as a server can inconsistently appear both failed and functioning to failure-detection systems, presenting different symptoms to different observers. It is difficult for the other components to declare it failed and shut it out of the network, because they need to first reach a consensus regarding which component has failed in the first place. However, the ecosystem 200 may use techniques such as the BFT State Machine Replication protocol and Merkle Tree data structures to ensure that the Replica and Client nodes' data are identical and to therefore provide tolerance against such faults.

According to various embodiments, interactions with the replica nodes may be conducted via client nodes, such as the client nodes 212 and 214. Each of the client and replica nodes may implement an application procedure interface (API) such as a Digital Asset Modeling Language ("DAML") ledger API server. According to various embodiments, DAML is an open-source smart contract language that aids in modeling agreements and runs on blockchain platforms. DAML Ledgers enable multi-party workflows by providing parties with a virtual shared ledger, which encodes the current state of their shared contracts, written in DAML.

In some implementations, a client node may communicate with one or more parties 216, 218, 220, 222 via a network such as the internet. According to various embodiments, a party may be a computing device on which an account in the public trust ledger has been authenticated, communicating via a secured session. For example, a party may submit a request to a client node, in accordance with methods described herein. The client node may send requests to one or more of the replica nodes and receive the results of running the requests. A client node may include a privacy-filtered subset of the state of the public trust ledger.

Figure 3:
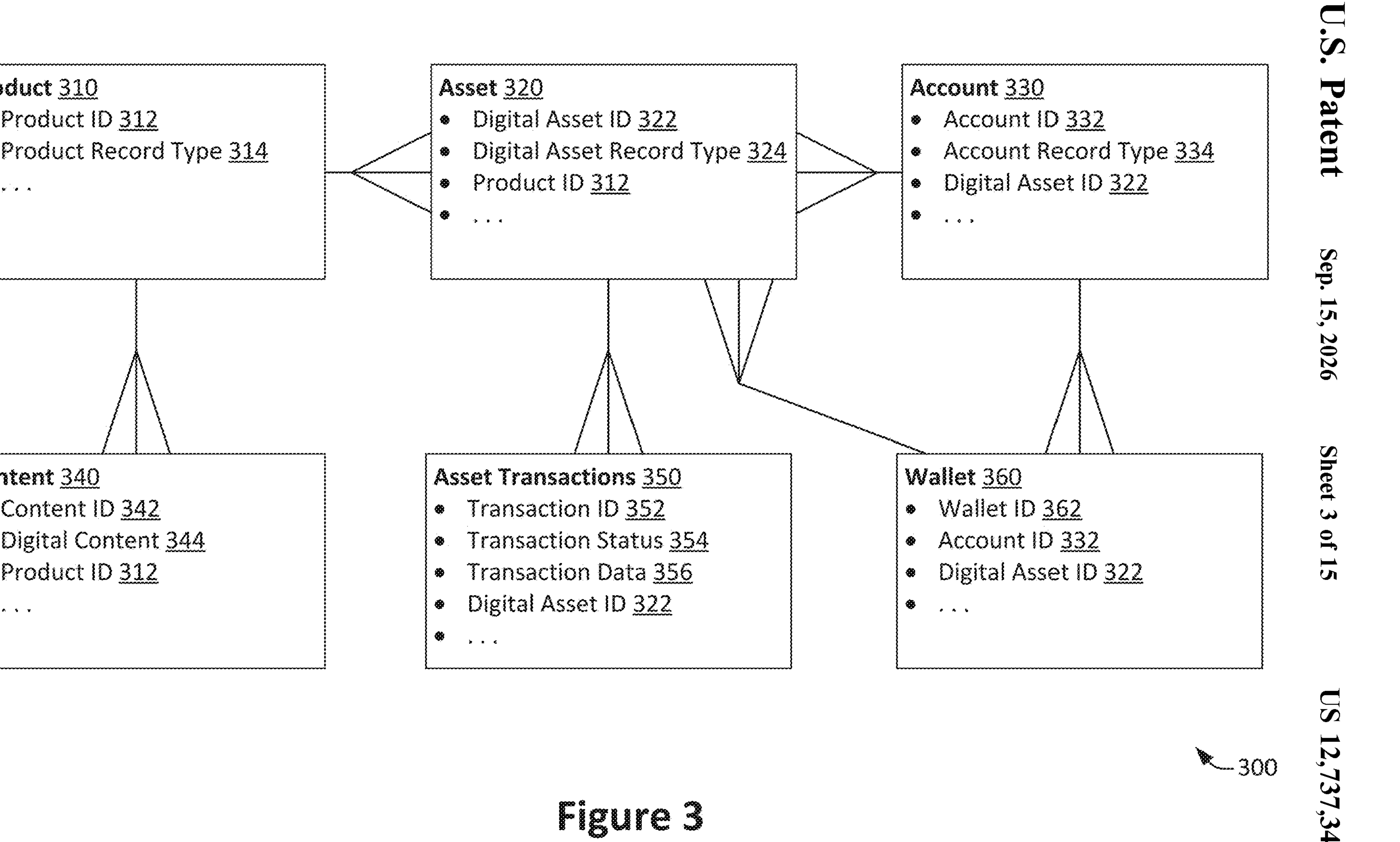
FIG. 3 illustrates an example of an arrangement of elements in a database system, configured in accordance with one or more embodiments.

FIG. 3 illustrates an example of an arrangement of elements in a database system 300, configured in accordance with one or more embodiments. The database system 300 includes the product table 310, the asset table 320, the account table 330, the content table 340, the asset transactions table 350, and the wallet table 360.

According to various embodiments, the product table 310 includes entries that identify the products to which the digital assets relate. An entry in the product table 310 may include a product ID 312 that uniquely identifies the product. An entry may also include a product record type 314. A product record type may be, for example, an NFT, a branded token, a cryptocurrency, or any other suitable product type.

According to various embodiments, the content table 340 includes additional content information associated with a product. An entry in the content table may include a content ID 342 that identifies the content. Alternatively, or additionally, an entry in the content table may include a product ID 312 identifying a product to which the content relates. In particular embodiments, a single product represented by an entry in the product table 310 may be associated with more than one entry in the content table 340.

In some implementations, the entry may also include digital content 344. The digital content may include, for example, media data associated with a product. Such media data may include, but is not limited to: one or more videos, animations, images, documents, or audio segments. In some configurations, the digital content data may be stored within the content table 340. Alternatively, or additionally, digital content data may be stored in a different location and a reference to that location or data stored within the content table 340.

According to various embodiments, the asset table 320 may store information about digital assets associated with tokens. For example, a digital asset may be a fungible token such as cryptocurrency or rewards program points. As another example, a digital asset may be ownership of, copyright to, or some other right related to an NFT. Various types of digital assets are possible, and a single product may be associated with more than one digital asset.

According to various embodiments, an entry in the asset table 320 may include a digital asset ID 322 that uniquely identifies the digital asset. An entry may also include a digital asset record type 324 that identifies the type of digital asset. For instance, the digital asset record type 324 may be an NFT, branded token, cryptocurrency, or any other suitable digital asset type.

According to various embodiments, the asset transactions table 350 may store information related to transactions involving the assets identified in the asset table 320. Accordingly, an entry in the asset transaction table 350 may include a transaction ID 352 that uniquely identifies the transaction and a digital asset ID 322 to which the transaction pertains. A single digital asset ID 322 may be associated with more than one transaction.

In some implementations, an entry in the asset transaction table 350 may include a transaction status field 354. The transaction status field 354 may store information such as whether the transaction is pending, canceled, or complete.

In some implementations, an entry in the asset transaction table 350 may include transaction data 356. The transaction data 356 may include any information related to the transaction. For example, the transaction data 356 may include or reference a contractual agreement that provides legal support for a transfer of rights represented by the transaction.

According to various embodiments, the account table 330 may store information that links database system accounts with digital assets. An entry in the account table 330 may include an account ID 332 that uniquely identifies an account within the database system. The account ID 332 may correspond to an individual, an organization, or any other suitable entity type. In particular implementations, the database system 300 may be configured at least in part as a multitenant database. In such a configuration, the account ID 332 may identify a tenant within the multitenant database.

In some implementations, an entry in the account table 330 may include a digital asset ID 332 that uniquely identifies a digital asset. A single account ID 332 may be associated with more than one digital asset IDs 332.

In some implementations, an entry in the account table 330 may include an account record type 334. The account record type 334 may indicate, for instance, whether the account ID 332 included in the account record is a buyer or an issuer of the digital asset ID 332.

According to various embodiments, the wallet table 360 links database system accounts and digital assets with wallets in one or more public trust ledgers. For example, an entry in the wallet table 360 may include a wallet ID 362 that uniquely identifies a wallet in a public trust ledger. As another example, an entry in the wallet table 360 may include a digital asset ID 322 identifying a digital asset stored as a token in the wallet identified by the wallet ID 362. As yet another example, an entry in the wallet table 360 may include an account ID 332 the identifies an account in the database system associated with the wallet. A single database system account may be associated with more than one wallet.

In some implementations, the wallet table 360 may include a public trust ledger ID, for instance in a configuration in which the database system 300 interacts with more than one public trust ledger.

The configuration of tables shown in FIG. 3 is only one example of a database system configuration that may be used in conjunction with techniques and mechanisms described herein. According to various embodiments, any of a variety of database system configurations may be used. For example, two or more of the tables shown in FIG. 3 may instead be implemented in a single table. As another example, information shown in FIG. 3 as being stored in a single table may instead be stored in more than one table. As yet another example, tables shown in FIG. 3 may include other information not represented in FIG. 3.

In some implementations, the database system 300 may be implemented as a multitenant database. In such a configuration, a database account ID 332 may uniquely identify a tenant within the multitenant database. Alternatively, a different type of database architecture may be employed.

According to various embodiments, the database system 300 may include many components other than those shown in FIG. 3. Examples of the types of components that may be included in a database system are discussed with respect to FIG. 13, FIG. 14A, and FIG. 14B.

Figure 4:
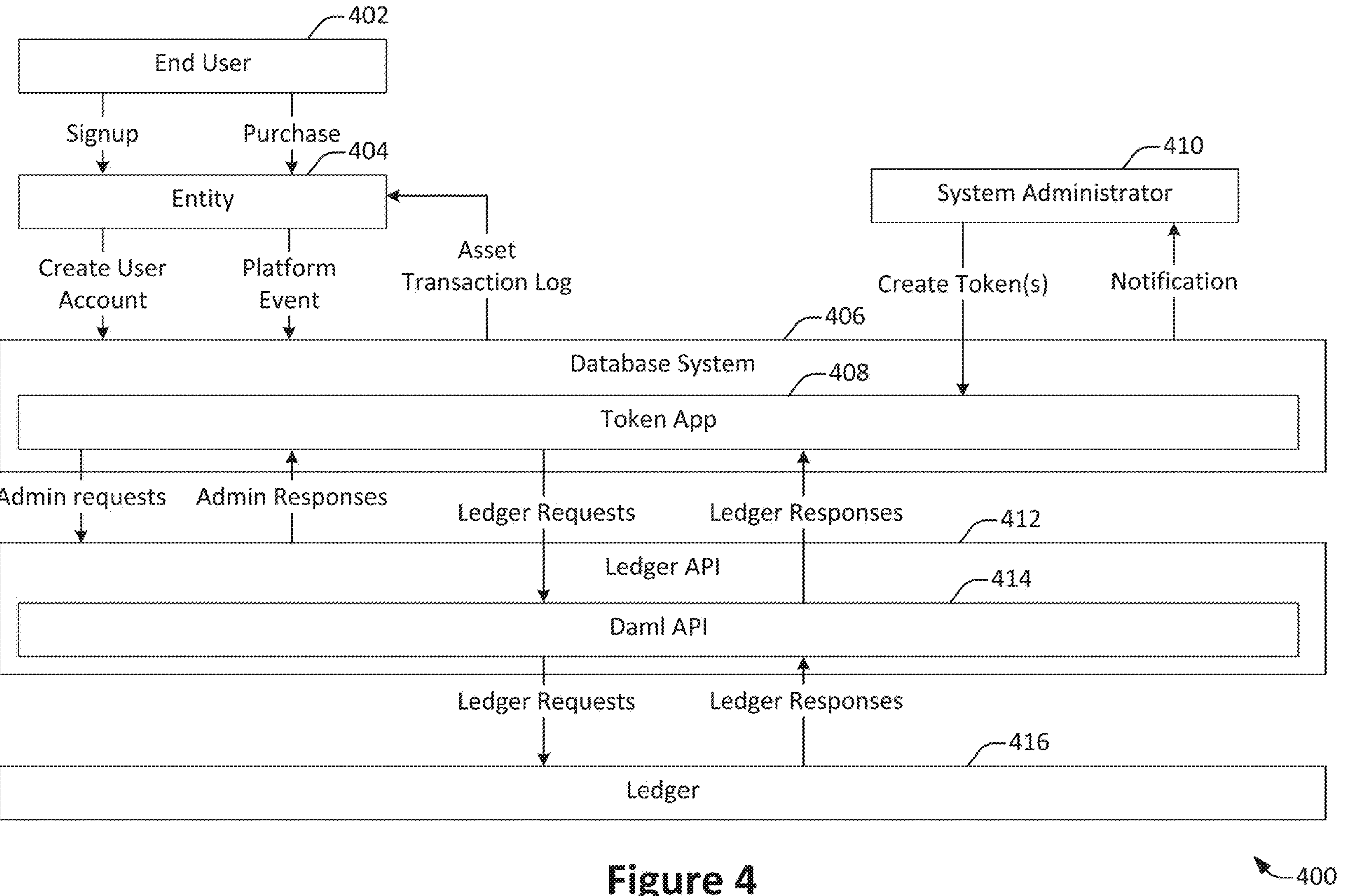
FIG. 4 illustrates an architecture diagram of a system facilitating interactions between a database system and a public trust ledger, configured in accordance with one or more embodiments.

FIG. 4 illustrates an architecture diagram of a system 400 facilitating interactions between a database system and a public trust ledger, configured in accordance with one or more embodiments. The system 400 includes an end user 402, an entity 404, a database system 406, a token app 408, a system administrator 410, a ledger API 412, a DAML API 414, and a ledger 416. FIG. 4 illustrates, at a high level, some of the interactions between such components, interactions which are explored in additional detail throughout the application.

According to various embodiments, the end user 402 may be a computing device associated with a user interacting with the entity 404. For example, the end user 402 may sign up to establish a public trust ledger account for accessing digital assets and may purchase, or be awarded, such assets. As used herein, the term "purchase" may refer to a transaction in which a digital asset is acquired in exchange for currency. However, the term "purchase" may also refer to other types of transactions, such as when a user is awarded a digital asset as an incentive or reward.

According to various embodiments, the entity 404 may be an organization accessing computer services provided by the database system 406. For example, the entity 404 may be a business accessing customer relations management services, data storage services, or any other computing services via the database system 406.

According to various embodiments, the database system 406 may be configured to provide various services to a variety of entities via the internet. Such services may include, but are not limited to CRM services, sales management services, account service management services, social media services, and training services. Examples of components included in a database system are discussed in additional detail throughout the application, for example with respect to the FIG. 13, FIG. 14A, and FIG. 14B.

According to various embodiments, the database system 406 may include a token app 408 for performing operations related to digital assets. The entity 404 may communicate with the database system 406 to perform operations such as creating an account for the end user 402, request to transfer a digital asset to the user's account, and/or receive information relating to such transactions.

According to various embodiments, the system administrator 410 may be a computing device authenticated to an individual configured to perform administrative operations on behalf of the entity 404. For example, the system administrator 410 may perform operations such as creating digital assets and associated tokens and/or receiving notifications related to digital assets.

According to various embodiments, the ledger API 412 may provide a point of contact for interacting with the public trust ledger. For example, the token app 408 may send and receive administrative communications with the ledger API 412. Such communications may include, for instance, various configuration operations.

The ledger API 412 may include a DAML API 414. According to various embodiments, the DAML API 414 may be configured to communicate directly with the public trust ledger 416. For instance, the DAML API 414 may be configured to perform operations such as specifying transactions for recording in the ledger 416.

Figure 5:
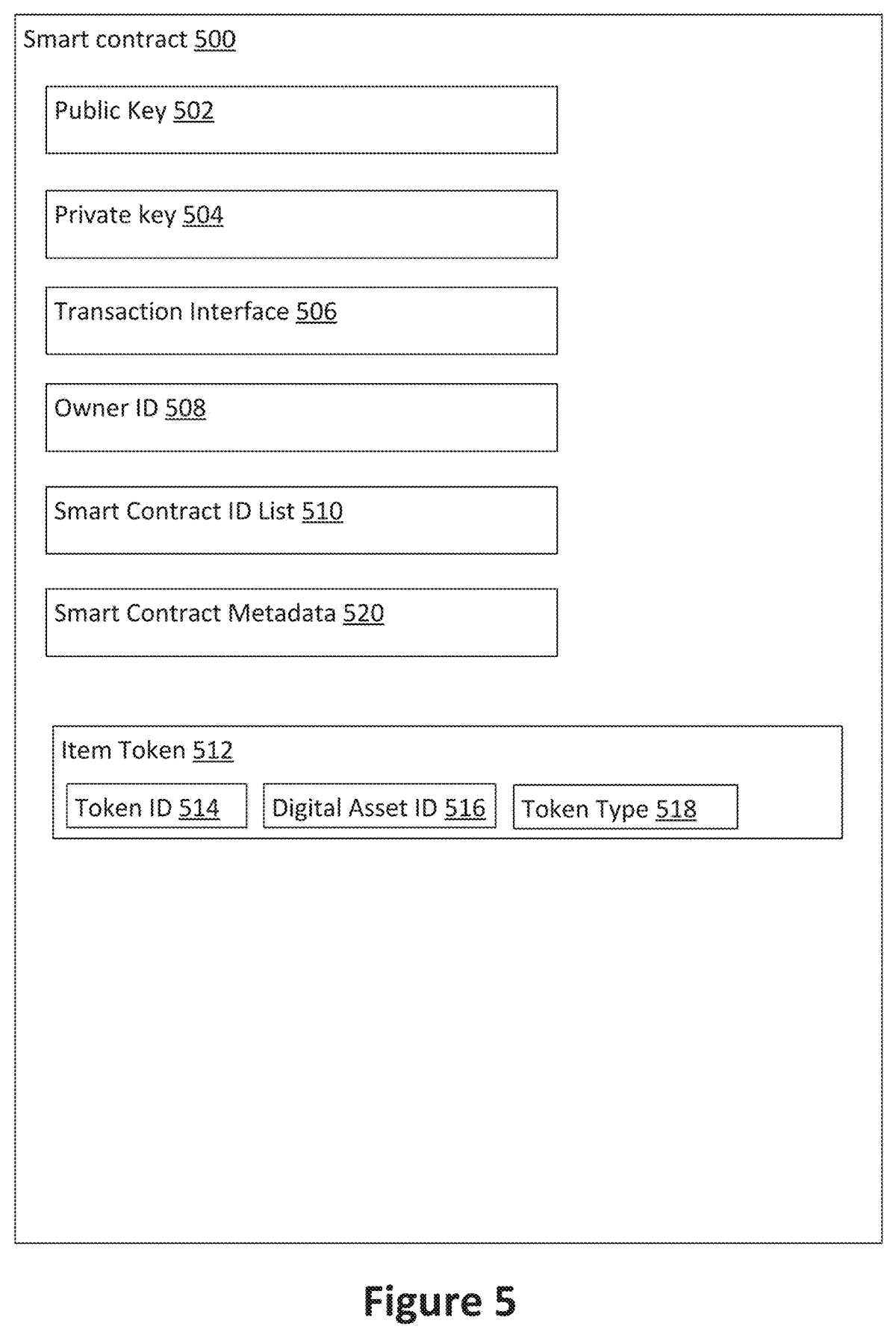

FIG. 5 illustrates an example of a smart contract 500, configured in accordance with one or more embodiments. According to various embodiments, the smart contract 500 may be used to record transactions related to digital assets in a public trust ledger. The smart contract 500 includes a public key 502, a private key 504, a transaction interface 506, an owner ID 508, a smart contract ID list 510, one or more item tokens 512, and smart contract metadata 520.

In some implementations, the smart contract 500 is a computer program that may be included within a public trust ledger such as a blockchain. The smart contract 500 may then be executed to perform one or more operations, accessible via the transaction interface 506. Such transactions may include, but are not limited to: transferring ownership of one or more item tokens 512, providing one or more entries on the smart contract id list 510, and identifying the owner 508.

According to various embodiments, a smart contract may be implemented as a template and one or more instances of the template. For example, a template may be created for a particular type of token. Then, an instance of the smart contract template may be used to store some quantity of the token. For example, an instance of a smart contract may store one or more NFTs of a particular type and owned by a particular account. As another example, an instance of a smart contract template may store a quantity of a fungible token of a particular type and owned by a particular account. An instance of a smart contract template may be identified by, for example, an execution ID.

According to various embodiments, communication with the smart contract 500 may be secured via the public key 502 and the private key 504. The public key 502 is publicly available to anyone with access to the public trust ledger, while the private key 504 is private to the smart contract 502. Any system may employ the public key 502 to encrypt a message that can only be decrypted by the smart contract's private key. Similarly, the smart contrast 500 may encrypt a message using the private key 504. Although anyone may decrypt the message using the public key 502, the recipient of the message may verify that the message was sent by the smart contract 500 by virtue of its being decryptable using the smart contract's public key 502.

In some configurations, the public key 502 and the private key 504 may be used to encrypt some or all of the communication with the smart contract 500. Alternatively, or additionally, the public key 502 and the private key 504 may be used to facilitate a key exchange for the purpose of establishing a secure communication session between the smart contract 500 and another party to the communication session.

According to various embodiments, the owner ID 508 identifies the owner of the smart contract 500 and the included one or more tokens 512. The owner ID 508 may indicate an account in the public trust ledger. By authenticating as the owner associated with the owner ID 508, the owner may be able to authorize one or more transactions associated with the smart contract 500, such recording a transaction transferring the token 512 to a different party.

In some implementations, the smart contract ID list 510 may identify one or more other smart contracts associated with the smart contract 500. For example, the smart contract ID list 510 may identify one or more other smart contracts that are chained with the smart contract 500. In some configurations, one or more of the smart contracts identified by the smart contract ID list 510 may need to be executed in order for the smart contract 500 to be executed.

In some embodiments, the item token 512 identifies the digital asset being transferred. The token 512 includes a token ID 514, a digital asset ID 516, and a token type 518. The digital asset ID 516 is an identifier that identifies a digital asset recorded in a database system. For instance, the digital asset ID 516 may correspond with a value in column 314 for an entry in the digital asset table 310.

According to various embodiments, the token ID 514 is an identifier created when the token 512 is minted. The token ID 514 uniquely identifies the token 512 within the public trust ledger. The token type 518 indicates the type of token represented by the token 512. For example, the token type 518 may indicate ownership of the digital asset ID 516. As another example, the token type 518 may indicate ownership of one or more rights associated with the digital asset ID 516. Examples of such rights may include, but are not limited to: some or all of the copyrights associated with the digital asset identified by the digital asset ID 516, the right to transfer the digital asset identified by digital asset ID 516, or the right to transfer rights associated with the digital asset identified by digital asset ID 516.

In some implementations, a smart contract 500 may include a single token 512. Alternatively, a smart contract 500 may include more than one token. For example, the ERC-1155 standard as well as other types of token standards provide for multiple tokens within the same smart contract 500.

In some embodiments, the token 512 may be non-fungible. However, as discussed herein, techniques and mechanisms described herein may also be used in conjunction with fungible tokens.

According to various embodiments, the smart contract metadata 520 may include information stored within the smart contract that may be used for various purposes. For example, the smart contract metadata may include information used to determine whether a requested transfer is permissible. For instance, the smart contract metadata may include information such as the number of times a token may be transferred, the identities of one or more parties to whom the token may or may not be transferred, or other such constraints. Such information may be specified in any suitable format, such as JSON or XML.

Figure 6:
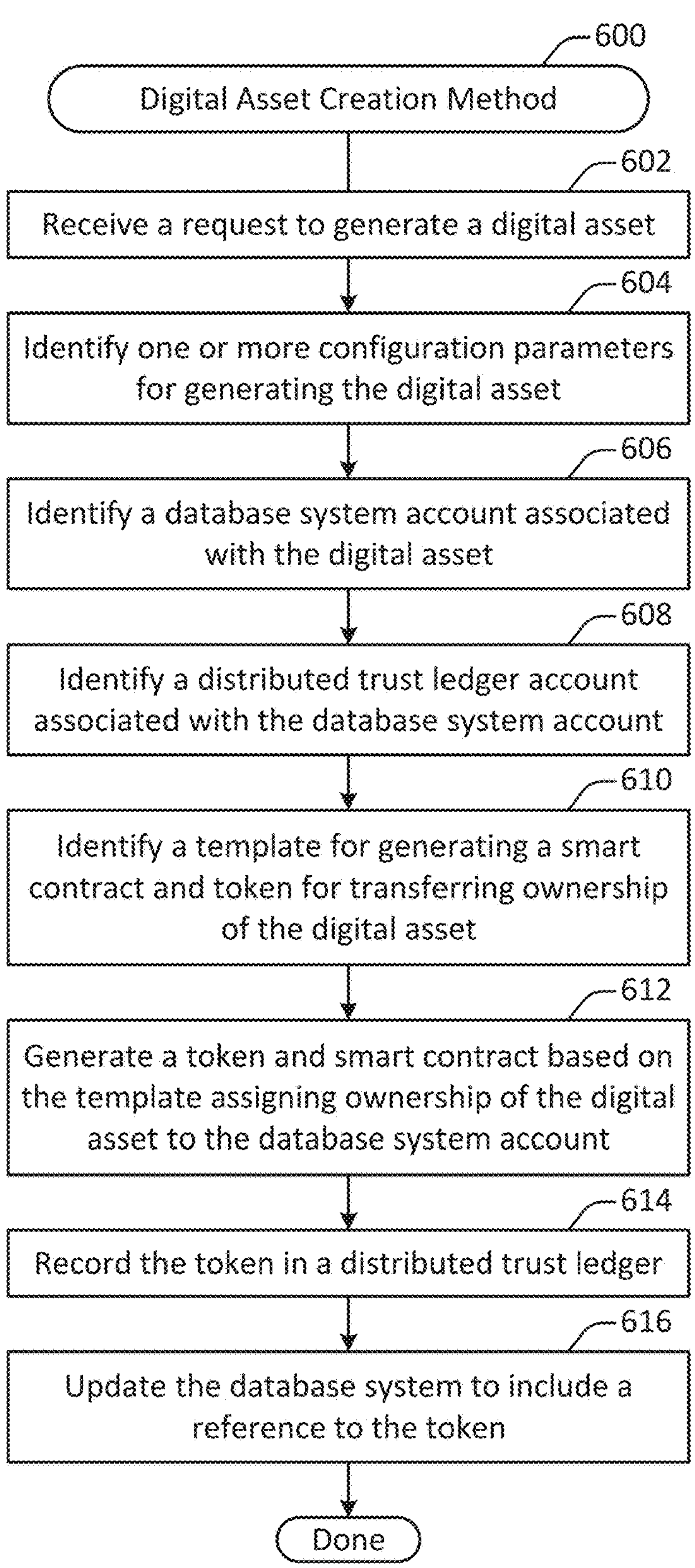
FIG. 6 illustrates an example of a method for creating a digital asset, performed in accordance with one or more embodiments.

FIG. 6 illustrates an example of a method 600 for creating a digital asset, performed in accordance with one or more embodiments. According to various embodiments, the method 600 may be performed at one or more computing devices within an on-demand computing services environment. The method 600 may be performed in order to create a digital asset and one or more associated tokens with one or more corresponding smart contracts.

A request to generate a digital asset is received at 602. According to various embodiments, the request may be received within the on-demand computing services environment. For example, an asset manager may provide user input requesting that the digital asset be generated. As another example, a digital asset may be generated automatically, for instance based on an automated script that is executed at a designated time or upon detection of a triggering condition. For instance, when a reference to a physical asset is added to the database system, a configuration parameter may indicate that a corresponding digital asset should be created as well.

One or more configuration parameters for generating the digital asset are identified at 604. In some implementations, a configuration parameter may be specified via user input. Alternatively, or additionally, a configuration parameter may be determined automatically, for instance based on a predetermined configuration file or a default configuration value.

According to various embodiments, various types of configuration parameters may be employed. Some parameters may relate to one or more rights that may be conferred by ownership of a digital token. Such parameters may include, but are not limited to: one or more rights to a digital asset, whether a right may be transferred, the number of times a right may be transferred, whether rights are separable or must be transferred together, and whether ownership may be fractional. Some parameters may relate to the nature of one or more tokens. Such parameters may include, but are not limited to: the quantity of tokens created, media content such as images, videos, sounds, or animations for creating the tokens, and/or one or more templates for smart contract and/or token creation.

In particular embodiments, the one or more configuration parameters may include metadata for generating the digital asset. For example, a product object as stored in the database system may be extensible in that in can include additional metadata. That metadata may include, for example, structured and/or unstructured data or rules, which may be used to generate token metadata for storing in the public trust ledger. That token metadata may be used in a variety of ways, such as for validating a transfer request against one or more transfer rules.

In particular embodiments, metadata may be stored in the public trust ledger in a privacy-sensitive manner. For example, personally identifying information such as a social security number, email address, or other such data may be hashed, and the resulting hash values stored in the public trust ledger. In this way, ownership of a token in the public trust ledger may be tied not only to a database account identifier, but also to personally identifying information. For instance, a verification process may involve hashing a known element of personally identifier information and ensuring that the resulting hash value matches information stored in the trust ledger. However, the personally identifying information need not be stored in the trust ledger in a cleartext state and therefore need not be publicly and permanently revealed.

A database system account associated with the digital asset is identified at 606. In some embodiments, the database system account may be identified based on the request received at 602. For instance, the request may be received from a computing device having authenticated in association with the database system account.

In some implementations, the database system account may correspond to an individual. Alternatively, the database system account may correspond to a different type of entity, such as an organization.

In particular embodiments, the database system may be a multitenant database configured to store information associated with multiple entities, or tenants, in the same database table. In such a configuration, the database system account may correspond to one of the tenants.

A public trust ledger account associated with the database system account is identified at 608. According to various embodiments, the public trust ledger account may be identified by consulting a correspondence table within the database system that links database system accounts with public trust ledger accounts. An example of such a table is shown in FIG. 3.

A template for generating a smart contract and token for transferring ownership of the digital asset is identified at 610. In some implementations, the template may identify attributes of the smart contract and/or token such as one or more of the parameters identified at 604.

A token assigning ownership of the digital asset to the database system account is generated based on the template at 612. According to various embodiments, generating the token may involve operations such as identifying attributes other than those specified in the template. For instance, a set of NFTs may be generated for various color combinations of a digital asset, such as an item of digital apparel that is usable in conjunction with a digital avatar. In such a situation, attributes specific to the NFT may be combined with the template identified at 610 and the distributed trust ledger account 608 to generate the NFT.

The smart contract and token are recorded in a public trust ledger at 614. In some implementations, the smart contract and token may be recorded by executing a token minting process. The token minting process may involve executing a smart contract on a public blockchain, such as the Ethereum blockchain. The minting process may involve one or more operations such as confirming the token as an asset on the blockchain, updating the account balance of the blockchain account identified at 326 to include the minted token, adding one or more transactions confirming such information to a block, and confirming the block to others within the blockchain network. The smart contract may be executed in part based on computations performed by one or more blockchain miners.

In particular embodiments, such as when the token is a fungible token, recording the token in a distributed trust ledger may involve registering the token in an exchange as exchangeable. Fungible tokens may include, but are not limited to, branded tokens, cryptocurrency, loyalty points, or other such interchangeable assets.

According to various embodiments, fungible and non-fungible tokens may vary in any of several ways. For example, non-fungible token may be required to possess one or more unique attributes. As another example, fungible tokens may be configured so as to be subdividable.

The database system is updated to include the reference to the token at 616. According to various embodiments, updating the database system may include generating or updating a database entry to include one or more identifiers associated with the token. For instance, a token ID, a token smart contract ID, a digital trust ledger account ID, and/or any other relevant information may be added to the database system. Additional details regarding the types of information that may be stored are described with respect to FIG. 3.

According to various embodiments, the method 600 may be performed in order to generate more than one digital asset. For instance, a set of digital assets may be generated for virtual clothing to be worn by digital avatars. In such a situation, a digital asset may be generated for each of a variety of combinations of clothing colors.

Figure 7:
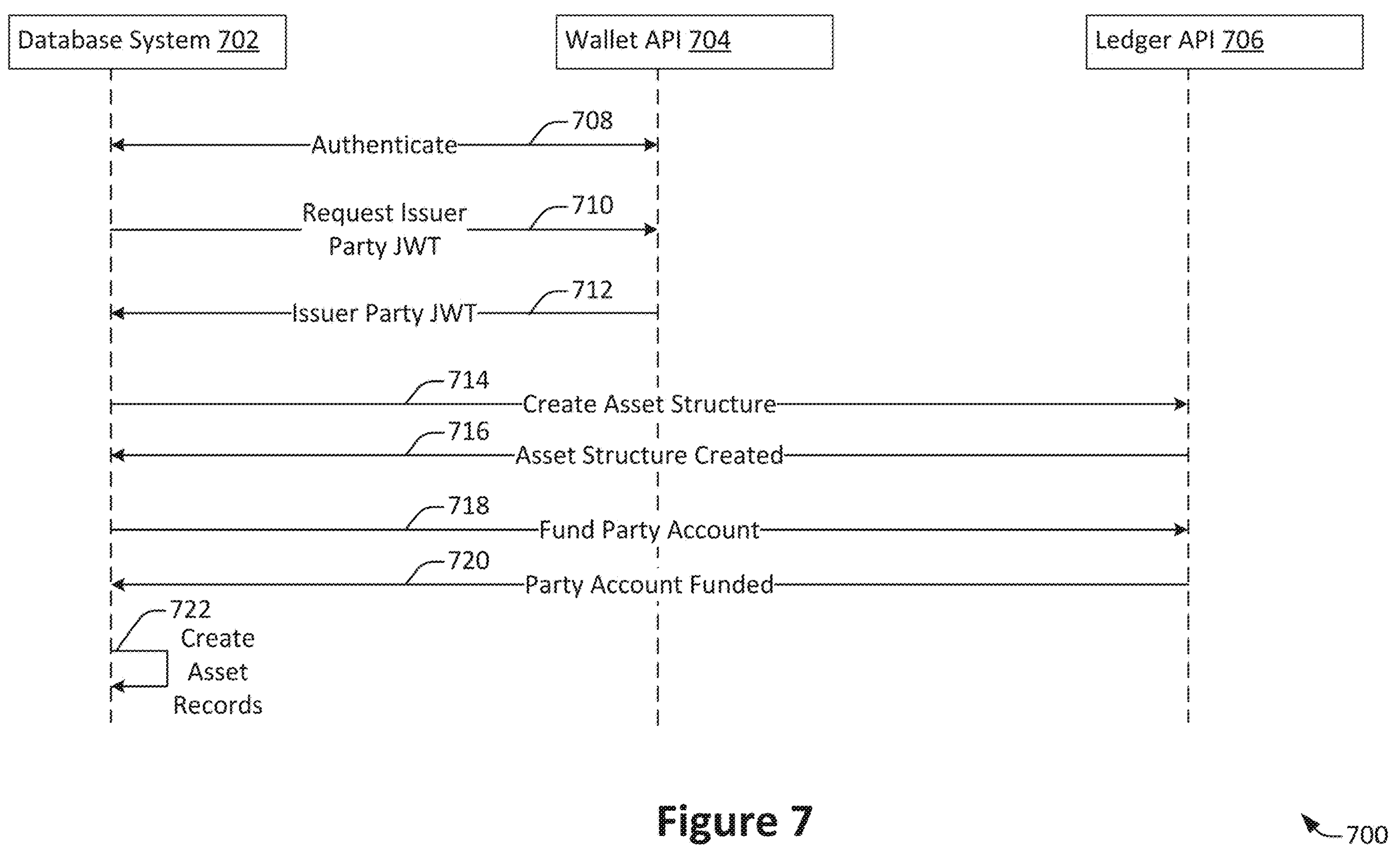
FIG. 7 illustrates an example of a procedure for minting a token, performed in accordance with one or more embodiments.

FIG. 7 illustrates an example of a procedure 700 for minting a token, performed in accordance with one or more embodiments. According to various embodiments, the token minting procedure may involve interactions between the database system 702, the wallet API 704, and the ledger API 706.

At 708, upon receiving a request to mint a token, the database system may authenticate the party associated with the request to the wallet API 704. For instance, the database system may verify to the wallet API that the database system includes has access to authentication credentials associated with the request issuer.

An issuer party JSON web token (JWT) is requested at 710 and returned at 712. According to various embodiments, a JWT is a token that facilitates the creation of data. A JWT payload may include JSON that asserts some number of claims. A JWT may be signed an/or encrypted. When a request is made by the database system to mint a token, receiving a JWT from the wallet API 704 allows the database system 702 to interacting with the ledger API 706 to mint the token on behalf of the wallet API 704. That is, the database system 702 may use the JWT to effectively authenticate as a particular wallet to the ledger API 706. It should be noted that a JWT is only one example of the way in which such authentication may occur.

A request to create an asset structure for the token is sent to the ledger API 706 at 714, and a response message is returned at 716. According to various embodiments, the request sent at 714 may define one or more characteristics of the token, for instance as discussed with respect to the method 600 shown in FIG. 6.

A request to fund a party account is sent to the ledger API 706 at 718, and a response message is returned at 720 indicating that the party account has been funded. According to various embodiments, the request sent at 718 may be used to assign the asset to the wallet identified by the issuer party JWT returned at 712.

At 722, one or more records of the asset or assets are created in the database system. For example, one or more records discussed with respect to the database system 300 shown in FIG. 3 may be created.

Figure 8:
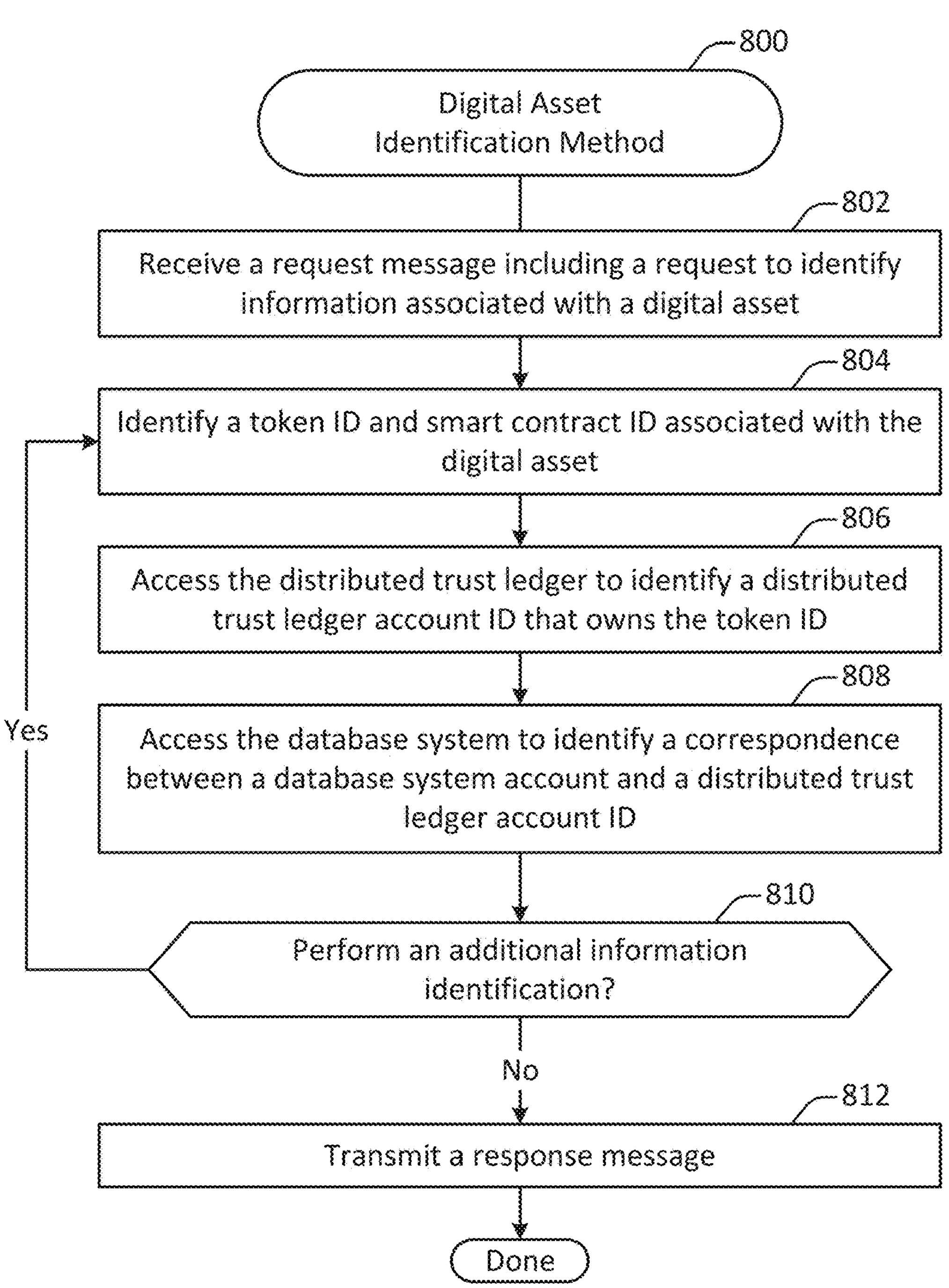
FIG. 8 illustrates an example of a method for identifying one or more parties associated with a digital asset, performed in accordance with one or more embodiments.

FIG. 8 illustrates an example of a method 800 for identifying information associated with a digital asset, performed in accordance with one or more embodiments. In some implementations, the method 800 may be performed at an on-demand database system. Alternatively, or additionally, the method 800 may be performed at a system configured to analyze a public trust ledger.

A request message including a request to identify information associated with a digital asset is received at 802. According to various embodiments, the method 800 may be used to identify any of various types of information, such as a current or previous owner of an NFT associated with a digital asset or a digital asset own by a particular party.

According to various embodiments, the request may include any of various request parameters used to query digital asset information. For example, the request may include a token identifier associated with a digital asset. As another example, the request may include a trust ledger account ID that may own a digital asset. As another example, the request may include a database system account ID that may own a digital asset. As yet another example, the request may include a smart contract ID that may include a token for a digital asset. Various types of queries are possible. As still another example, the request may include a digital asset identifier associated with the database system.

A token ID and smart contract ID associated with the digital asset are identified at 804. According to various embodiments, such information may be identified in any of various ways. For example, such information may be included with the request received at 802. As another example, such information may be determined or verified by accessing the database system. For instance, one or more of the tables shown in FIG. 3 may be queried using information included in the request. As yet another example, such information may be determined or verified by analyzing the public trust ledger.

The public trust ledger is accessed at 806 to identify a public trust ledger account ID that owns the token ID. In some implementations, information from the public trust ledger may be accessed by syncing some or all of the distributed public trust ledger with a local machine. Alternatively, or additionally, a trusted platform that provides access to the public trust ledger may be queried to access the information.

The database system is accessed at 808 to identify a correspondence between a database system account and a public trust ledger ID. According to various embodiments, accessing the database system may involve querying the table 330 shown in FIG. 3. For example, a database account ID may be used to identify a corresponding trust ledger account ID. As another example, a trust ledger account ID may be used to identify a corresponding database account ID.

According to various embodiments, when an identifier is identified, additional information may be identified as well. For instance, information about an database system account or public trust ledger account, such as the account name or other contact information, may be returned.

A determination is made at 810 as to whether to perform additional information verification. In some implementations, the determination may be made at least in part on the nature of the query. For instance, a query may indicate a request to identify all owners of rights that pertain to a particular digital asset. Alternatively, or additionally, the determination made at 810 may be made at least in part based on user input. For instance, a user may provide a request to identify additional information pertaining to a different or related right or digital asset.

According to various embodiments, queries may be linked in various ways. For example, to identify a copyright holder associated with a digital asset, the system may first identify a token and associated token owner for the digital asset. That information may then be used to identify a related NFT associated with copyright for the digital asset.

A response message is transmitted at 812. According to various embodiments, the response message may include any or all of the information discussed with respect to FIG. 8, and/or any other suitable information.

According to various embodiments, the operations shown in FIG. 8 may be performed in an order different than that shown. For example, an identification process may start with a database account ID and then identify information such as one or more tokens and corresponding digital assets owned by a public trust ledger account associated with that database account ID. As another example, an identification process may start with a public trust ledger ID and then identify information such as a database account ID corresponding with the public trust ledger ID. Various types and combinations of queries are possible.

Figure 9:
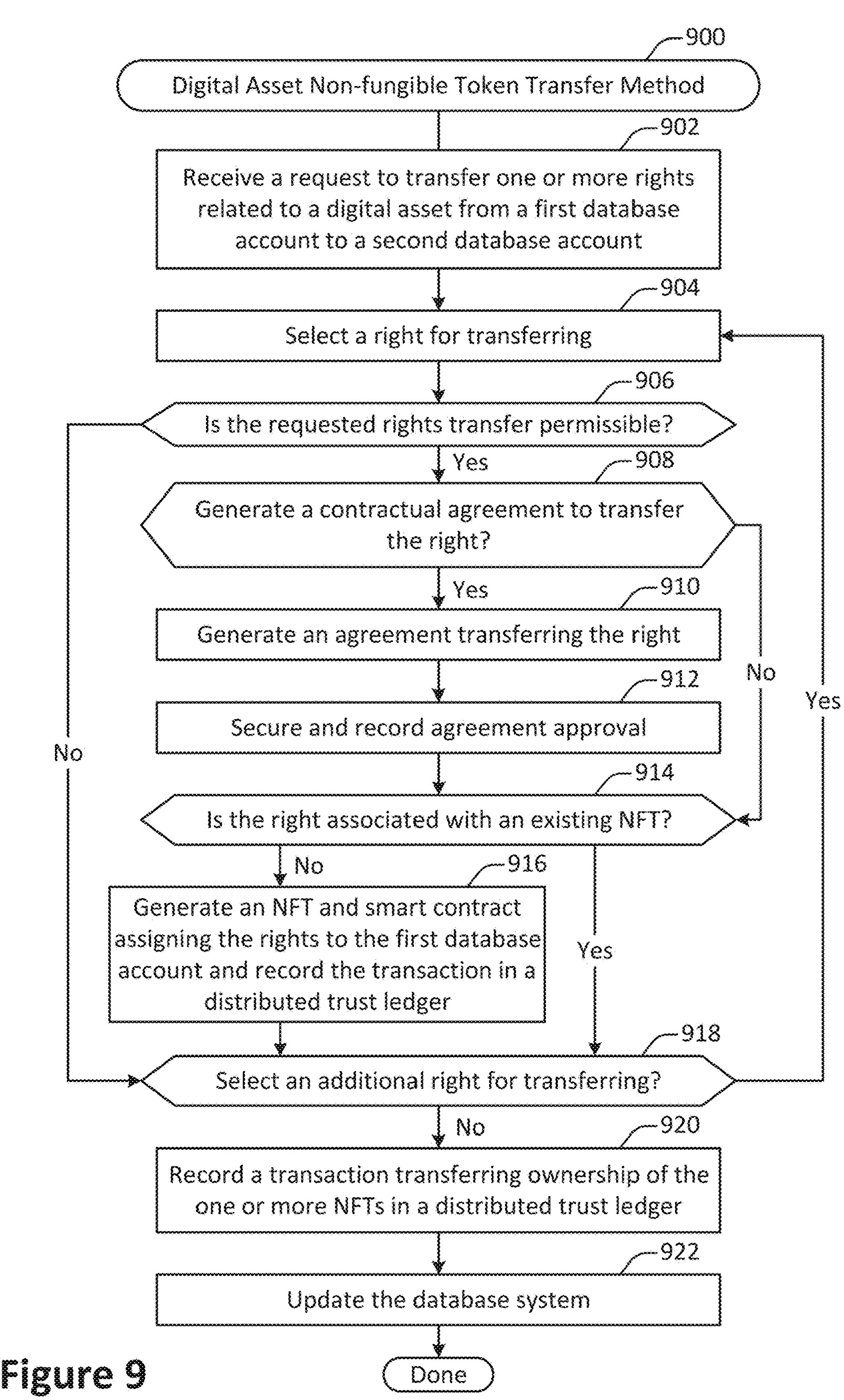
FIG. 9 illustrates an example of a method for transferring a digital asset non-fungible token, performed in accordance with one or more embodiments.

FIG. 9 illustrates an example of a method 900 for transferring a digital asset, performed in accordance with one or more embodiments. The method 900 may be performed at one or more computing systems within an on-demand database system. The method 900 may be used to transfer one or more NFTs providing ownership of a digital asset and/or other rights related to the digital asset from a first party to a second party.

A request is received at 902 to transfer a one or more rights for a digital asset from a first database account to a second database account. In some implementations, the request may be generated based on user input. For instance, a user associated with one database account may generate a request to transfer a right to a second database account. In some embodiments, the request may be generated automatically. For instance, the request may be generated when the database system detects that a transaction related to a digital asset has occurred.

A right is selected for transferring at 904. In some implementations, the right selected for transferring may be identified in the request received at 902. Alternatively, or additionally, one or more rights may be selected by a user, for instance by providing input via a user interface.

According to various embodiments, a digital asset transfer method may be used to transfer multiple NFTs associated with a digital asset. For example, a database account may transfer a first NFT providing ownership rights to the digital asset, a second NFT providing a limited copyright over the digital asset, and a third NFT providing a right to modify the digital asset. Alternatively, or additionally, a digital asset transfer method may be used to transfer an NFT providing rights over a digital asset without transferring ownership of the digital asset. For example, a database account may transfer a right to modify a digital asset without transferring ownership of the digital asset.

A determination is made at 906 as to whether the requested rights transfer is permissible. According to various embodiments, the determination made at 906 may involve determining whether rights associated with the digital asset are owned by the first database account. In some embodiments, one or more rights may be associated with the first database account by default. For instance, if the digital asset was created by the holder of the first database account, then that party may be assumed to hold copyright, transfer rights, and other such rights associated with the digital assets.

In some implementations, one or more rights may be associated with the first database account by virtue of the first database account owning an NFT associated with the rights. The ownership status of an NFT associated with the right may be verified in one or more of various ways. For example, the database system may record the current owner of the NFT, as discussed with respect to the database system 300 configured as shown in FIG. 3. As another example, the ownership of the NFT may be validated by consulting the public trust ledger. An example of a method for verifying NFT ownership by interacting with a public trust ledger is shown in the method 800 in FIG. 8.

In some implementations, the determination made at 906 may involve evaluating one or more validation rules determined based on metadata stored within the smart contract. For example, the smart contract may include a rule prohibiting the token from being transferred more than a designated number of times. As another example, the smart contract may include a rule prohibiting the token from being transferred to a particular entity.

A determination is made at 908 as to whether to generate a contractual agreement to transfer the right. According to various embodiments, the determination may be made at least in part based on the right being transferred. For example, ownership rights may not need a contractual agreement to facilitate a transfer, while a contractual agreement may be needed to transfer a copyright. As another example, a right may be transferrable without a signed contractual agreement in one jurisdiction, whereas a different jurisdiction may require a signed contractual agreement to effectuate a transfer. Such requirements may be stored as metadata within the database system and/or within the public trust ledger.

If a determination to generate a contractual agreement is made, then at 910 such an agreement may be generated. In some implementations, generating a contractual agreement may involve identifying a template associated with the type of rights being transferred and then completing that template with information associated with the specific transfer being effectuated. For instance, a template for transferring copyright over an item of digital apparel for an avatar may be filled out with information such as the identity of the party that currently owns the item, the identity of the party to whom the item is being transferred, and identifying information for the item being transferred.

Approval of the agreement is secured and recorded at 912. According to various embodiments, securing approval may be performed in any of various ways. For example, a party may sign an agreement using a digital signature mechanism. As another example, an agreement may be printed, physically signed by a representative of the party, and scanned. The particular method used to secure approval of the agreement may depend, for instance, on the type of rights being transferred and any specific requirements (e.g., jurisdictional requirements, requirements imposed by the parties, etc.) associated with the transfer of such rights.

In some implementations, approval may need to be secured from both parties. For instance, the transfer of ownership or copyright may involve securing approval from both the transferee and the transferor. Alternatively, approval may only need to be secured from one of the parties. For example, for some rights approval may need to be obtained only for the party transferring the right.

A determination is made at 914 as to whether the right is associated with an existing NFT. According to various embodiments, such a determination may be made by querying the database system 300 shown in FIG. 3.

If the right is not associated with an existing NFT, an NFT and associated smart contract assigning the rights to the first database account may be created and recorded in a public trust ledger at 916. The creation and recordation of such an NFT may be substantially similar to the operations 510-516 shown in FIG. 5.

In some implementations, more than one NFT may be created, for instance in the event that more than one right is selected for transfer. In such a situation, the creation and recordation of NFTs and smart contracts for the different rights may be performed as part of the same transaction.

A determination is made at 918 as to whether to select an additional right for transferring. According to various embodiments, additional rights may be selected until all rights identified for transferring are associated with a respective NFT and contractual agreements have been generated and approved wherever such agreements are indicated.

At 920, a transaction transferring ownership of the one or more NFTs is recorded in a public trust ledger. In some embodiments, multiple NFT transfers may be grouped into a single public trust ledger transaction. Alternatively, or additionally, an NFT transfer may be treated as a distinct transaction for recording within the public trust ledger.

The database system is updated at 922. According to various embodiments, updating the database system may involve storing an indication of the transactions recorded at operations 908 or 920. For instance, the database system 300 shown in FIG. 3 may be updated to indicate that the second party is now the owner and/or rights holder associated with the digital asset and that the first party is no longer the owner and/or rights holder.

In particular embodiments, NFT creation and/or transfer transactions may be combined in various ways. For example, the ERC-1155 standard allows for including multiple NFTs within the same smart contract. Such an approach may help to reduce the transaction costs associated with recording transactions in the public trust ledger.

Figure 10:
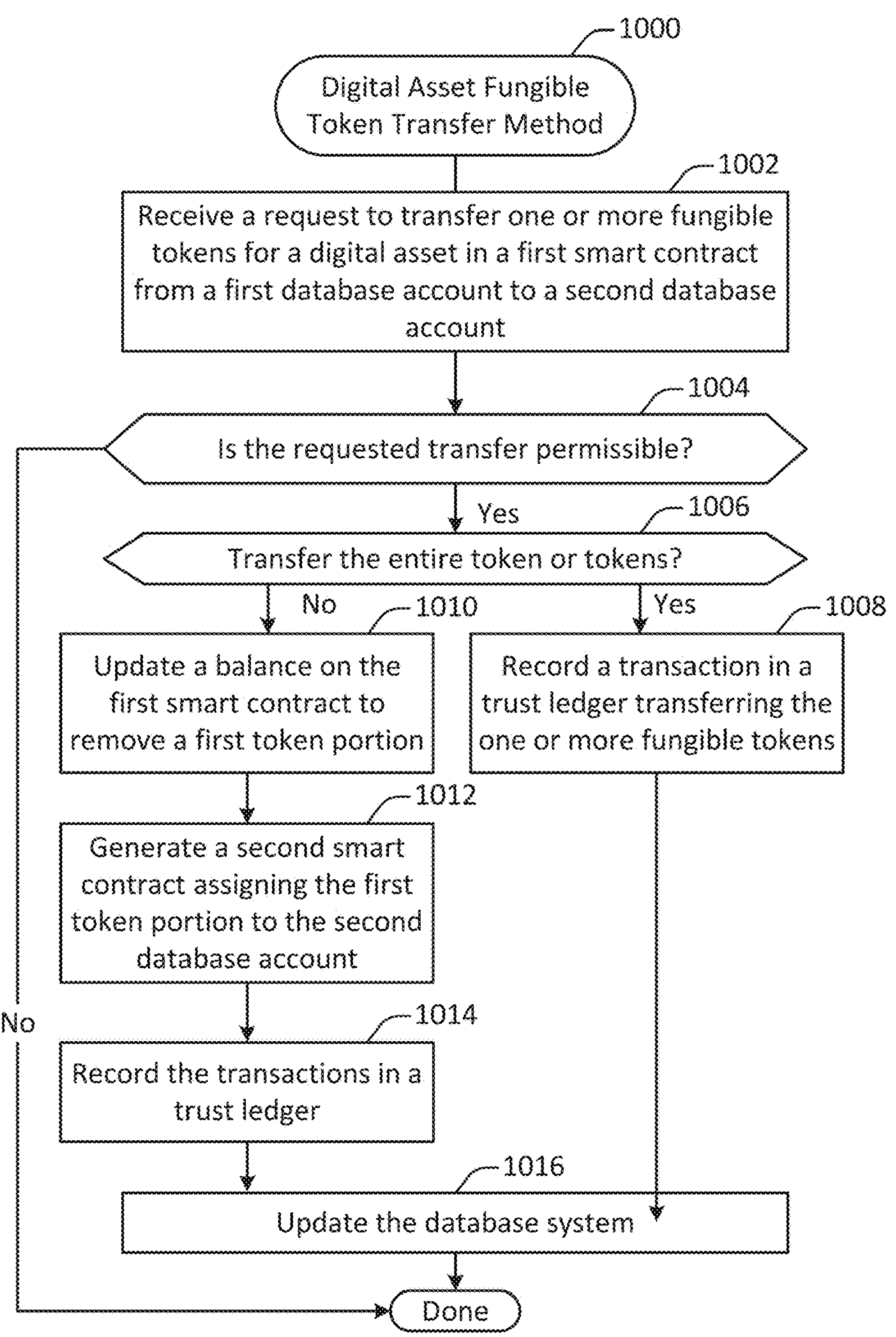
FIG. 10 illustrates an example of a method for transferring a digital asset fungible token, performed in accordance with one or more embodiments.

FIG. 10 illustrates an example of a method 1000 for transferring a digital asset fungible token, performed in accordance with one or more embodiments. The method 1000 may be performed at one or more computing systems within an on-demand database system. The method 1000 may be used to transfer one or more fungible token providing ownership of a digital asset and/or other rights related to the digital asset from a first party to a second party.

A request is received at 1002 to transfer a one or more fungible tokens for a digital asset from a first database account to a second database account. In some implementations, the request may be generated based on user input. For instance, a user associated with one database account may generate a request to transfer a right to a second database account. In some embodiments, the request may be generated automatically. For instance, the request may be generated when the database system detects that a transaction related to a digital asset has occurred.

A determination is made at 1004 as to whether the requested transfer is permissible. According to various embodiments, the determination made at 1004 may involve determining whether rights associated with the digital asset are owned by the first database account. In some embodiments, one or more rights may be associated with the first database account by default. For instance, if the digital asset was created by the holder of the first database account, then that party may be assumed to hold copyright, transfer rights, and other such rights associated with the digital assets.

In some implementations, one or more rights may be associated with the first database account by virtue of the first database account owning a token associated with the rights. The ownership status of a token associated with the right may be verified in one or more of various ways. For example, the database system may record the current owner of the token, as discussed with respect to the database system 300 configured as shown in FIG. 3. As another example, the ownership of the token may be validated by consulting the public trust ledger. An example of a method for verifying token ownership by interacting with a public trust ledger is shown in the method 800 in FIG. 8.

In some implementations, the determination made at 1004 may involve evaluating one or more validation rules determined based on metadata stored within the smart contract. For example, the smart contract may include a rule prohibiting the token from being transferred more than a designated number of times. As another example, the smart contract may include a rule prohibiting the token from being transferred to a particular entity.

A determination is made at 1006 as to whether to transfer the entire token or tokens. According to various embodiments, fungible tokens may be configured so as to be subdivided. For instance, a quantity of cryptocurrency, loyalty tokens, branded tokens, or other such tokens may be subdivided and transferred only in part to the second entity.

According to various embodiments, whether to subdivide the token or tokens, as well as the amount to transfer if subdivided, may be indicated in the request received at 1002. Alternatively, or additionally, user input indicating such information may be received. As still another possibility, such information may be determined automatically, for instance by matching the subdivided portion to a quantity need to complete a purchase.

When it is determined to transfer the entire token or quantity of tokens, then at 1008 a transaction transferring the one or more tokens is recorded in the trust ledger. According to various embodiments, the transaction may be recorded by executing the first smart contract.

If instead a determination is made to transfer only a portion of the tokens, then at 1010 a balance on the first smart contract may be updated to remove a first portion of the token or tokens. At 1012, a second smart contract may be generated that assigns the first token portion to the second database account. Then, the transactions are recorded in a trust ledger at 1014. According to various embodiments, the transaction may be recorded at least in part by executing the first smart contract.

The database system is updated at 1016. According to various embodiments, updating the database system may involve storing an indication of the transactions recorded at operations 1008 or 1014. For instance, the database system 300 shown in FIG. 3 may be updated to indicate that the second party is the owner of the token, tokens, or token portions that were transferred, and that the first party is no longer the owner of the token, tokens, or token portions.

In particular embodiments, token creation and/or transfer transactions may be combined in various ways. For example, the ERC-1155 standard allows for including multiple tokens within the same smart contract. Such an approach may help to reduce the transaction costs associated with recording transactions in the public trust ledger.

Figure 11:
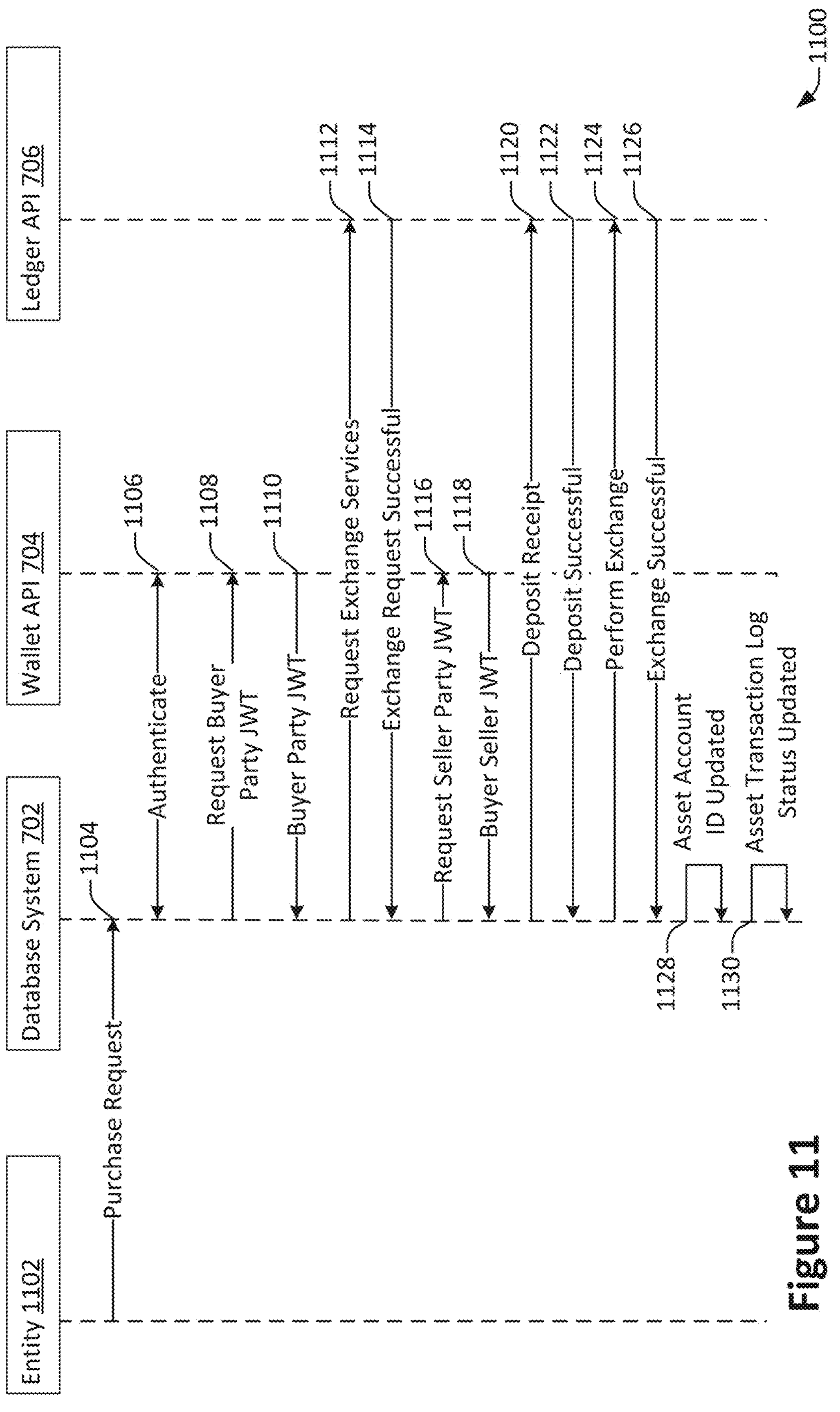
FIG. 11 illustrates an example of a messaging procedure for transferring a token, performed in accordance with one or more embodiments.

FIG. 11 illustrates a messaging procedure 1100 for transferring a token, performed in accordance with one or more embodiments. According to various embodiments, the messaging procedure 1100 may be used in conjunction with one or more techniques or mechanisms described herein, such as the methods 900 and 1000 shown in FIGS. 9 and 10.

A purchase request is sent from an entity 1102 at 1104. According to various embodiments, the entity 1102 may be any suitable entity within the database system. For example, the entity 1102 may be a computing device authenticated as a user or organization having a database system account. The purchase request may indicate one or more fungible and/or non-fungible tokens that the entity would like to purchase.

At 1106, upon receiving a request to purchase a token, the database system may authenticate the party associated with the request to the wallet API 704. For instance, the database system may verify to the wallet API that the database system includes has access to authentication credentials associated with the request issuer.

A buyer party JSON web token (JWT) is requested at 1108 and returned at 1110. According to various embodiments, when a request is made by the database system to purchase a token, receiving a JWT from the wallet API 704 allows the database system 702 to interacting with the ledger API 706 to transfer the token to the buyer's wallet. That is, the database system 702 may use the JWT to effectively authenticate as a particular wallet to the ledger API 706. It should be noted that a JWT is only one example of the way in which such authentication may occur.

Exchange services are requested at 1112 and confirmed at 1124. According to various embodiments, requesting exchange services may involve, for instance, initiating communication with the appropriate node. For example, the communication may involve establishing a communication with the node, verifying that the seller party is the owner of the token subject to the requested purchase, and/or verifying that the requested purchase is permissible.

A seller party JSON web token (JWT) is requested at 1116 and returned at 1118. According to various embodiments, when a request is made by the database system to purchase a token, receiving a JWT from the wallet API 704 allows the database system 702 to interacting with the ledger API 706 to transfer the token from the seller's wallet. That is, the database system 702 may use the JWT to effectively authenticate as a particular wallet to the ledger API 706. It should be noted that a JWT is only one example of the way in which such authentication may occur.

At 1120, the database system 702 requests to deposit the token from the seller's wallet. The deposit is confirmed at 1122. At 1124, the database 702 sends a request to perform the exchange. The exchange is confirmed at 1126. According to various embodiments, operations 1120 and 1122 may relate to, for example, the exchange of payment. The operations 1124 and 1126 may relate to the exchange of one or more tokens after payment is made and confirmed.

The asset account ID is updated in the database system at 1128. According to various embodiments, updating the asset account ID may involve updating a database entry associated with the digital asset to indicate that the purchaser is now the owner of the digital asset.

The asset transaction log status is updated at 1120. According to various embodiments, updating the asset transaction log status may involve creating or modifying an entry in the transaction table to indicate that the transaction has been completed.

A request to create an asset structure for the token is sent to the ledger API 706 at 714, and a response message is returned at 716. According to various embodiments, the request sent at 714 may define one or more characteristics of the token, for instance as discussed with respect to the method 600 shown in FIG. 6.

A request to fund a party account is sent to the ledger API 706 at 718, and a response message is returned at 720 indicating that the party account has been funded. According to various embodiments, the request sent at 718 may be used to assign the asset to the wallet identified by the issuer party JWT returned at 712.

At 722, one or more records of the asset or assets are created in the database system. For example, one or more records discussed with respect to the database system 300 shown in FIG. 3 may be created.

Figure 12:
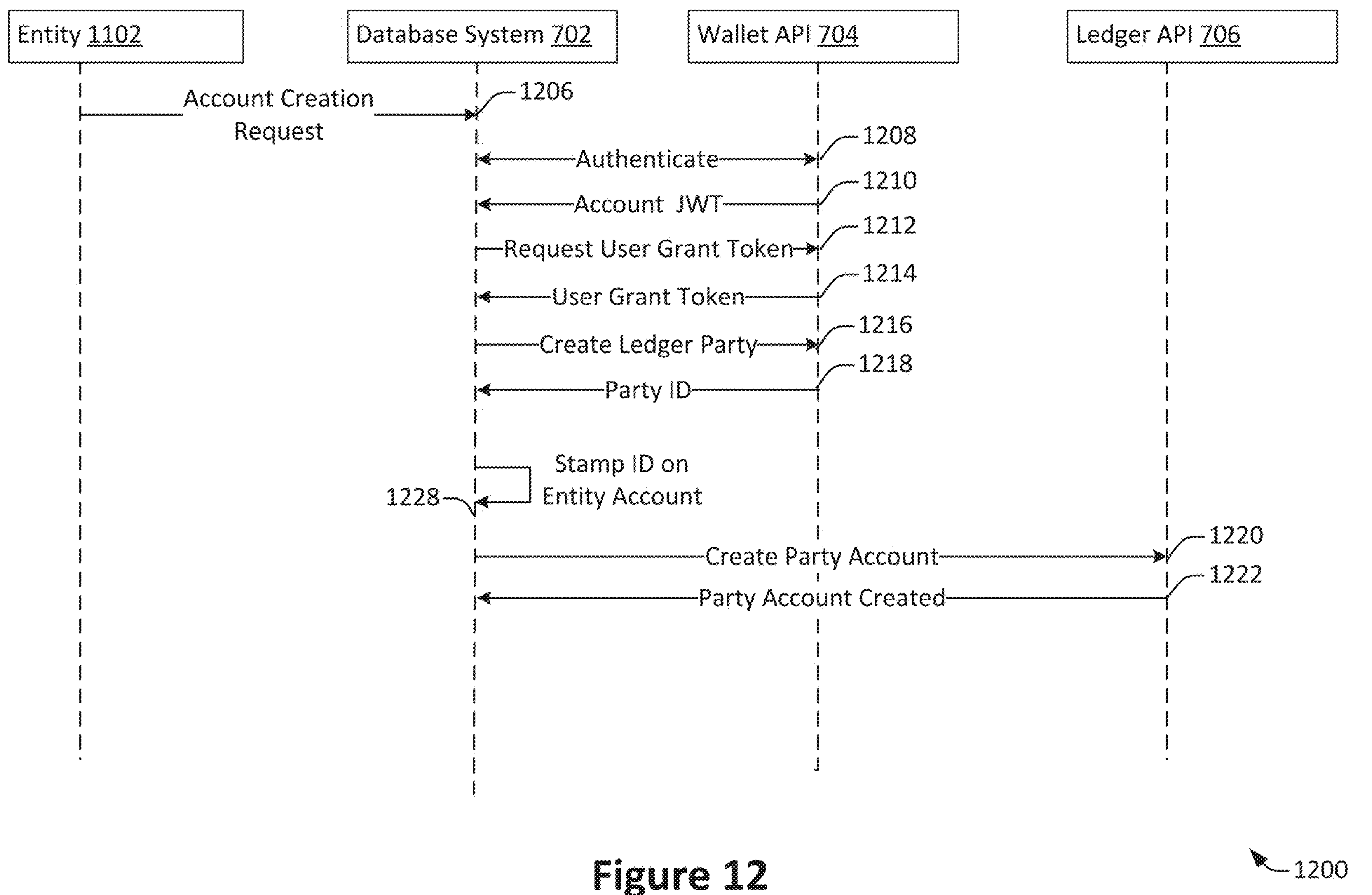
FIG. 12 illustrates an example of a messaging procedure for creating an account, performed in accordance with one or more embodiments.

FIG. 12 illustrates a messaging procedure 1200 for creating an account, performed in accordance with one or more embodiments. According to various embodiments, the messaging procedure 1200 may be used in conjunction with one or more techniques or mechanisms described herein, such as for example to create an account that may be used to issue or purchase tokens.

An account creation request is sent from an entity 1102 at 1206. According to various embodiments, the entity 1102 may be any suitable entity within the database system. For example, the entity 1102 may be a computing device authenticated as a user or organization having a database system account. The account creation request may include information identifying and authenticating the entity associated with the request.

At 1208, upon receiving a request to purchase a token, the database system may authenticate the party associated with the request to the wallet API 704. The wallet API 704 may respond by providing an account JWT at 1210, configured as discussed with respect to the methods 700 and 1100 shown in FIGS. 7 and 11.

A request user grant token is requested at 1212 and returned at 1214. According to various embodiments, the request user grant token may be used by the database system 702 to uniquely identify a new user being created. The new user may be associated with a new wallet created based on interacting with the wallet API 704, and the user's information recorded in the ledger API 706.

A request to create a party is sent to the wallet API at 1216, and the party's ID is returned at 1218. The party's ID is stamped on the entity's database system account at 1228. According to various embodiments, the party ID may uniquely identify the party in the distributed trust ledger.

At 1220, a request to record the creation of the party account in the public trust ledger is sent to the ledger API 706. A confirmation that the party account was recorded is returned at 1222.

Figure 13:
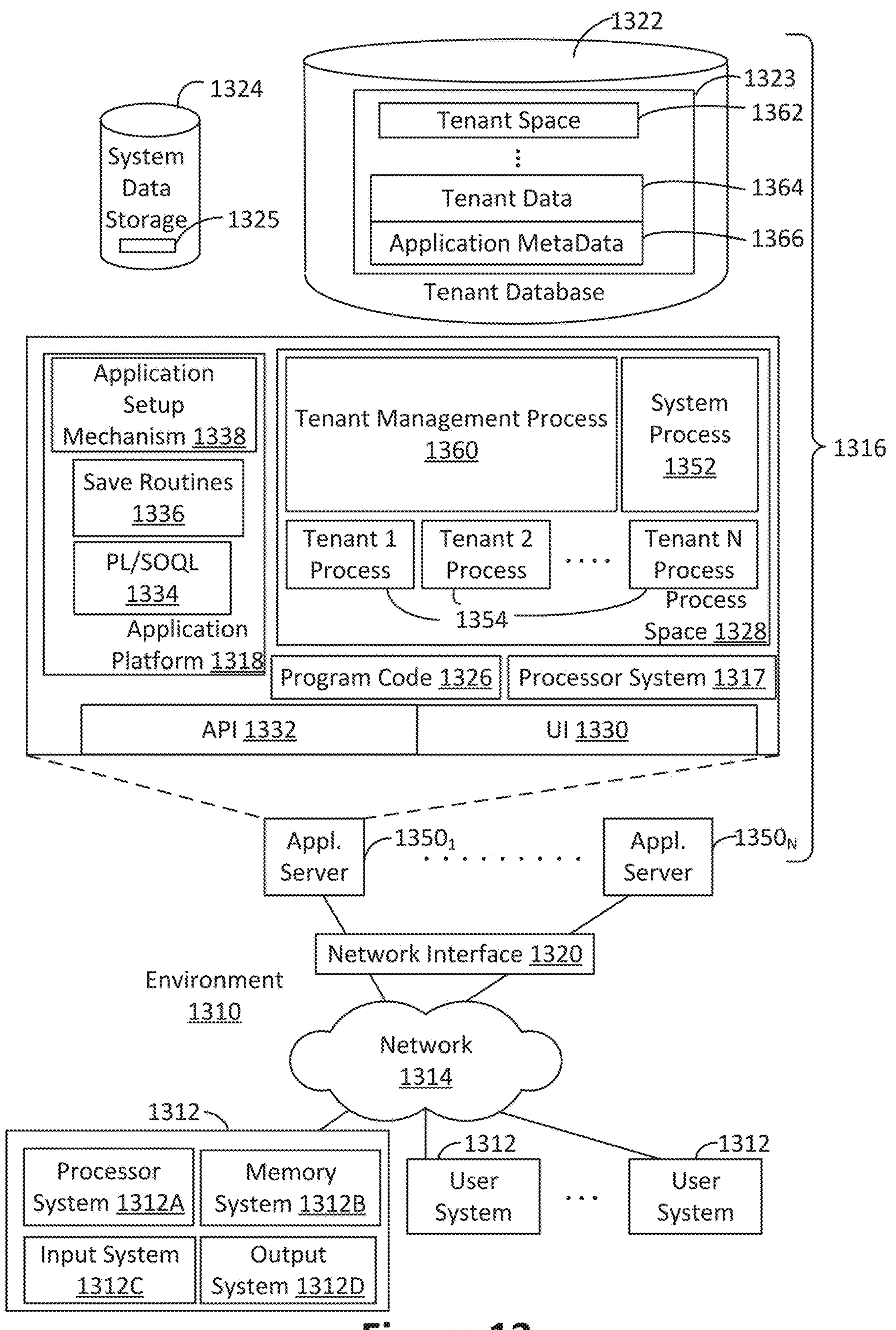
FIG. 13 shows a block diagram of an example of an environment 1310 that includes an on-demand database service configured in accordance with some implementations.

FIG. 13 shows a block diagram of an example of an environment 1310 that includes an on-demand database service configured in accordance with some implementations. Environment 1310 may include user systems 1312, network 1314, database system 1316, processor system 1317, application platform 1318, network interface 1320, tenant data storage 1322, tenant data 1323, system data storage 1324, system data 1325, program code 1326, process space 1328, User Interface (UI) 1330, Application Program Interface (API) 1332, PL/SOQL 1334, save routines 1336, application setup mechanism 1338, application servers 1350-1 through 1350-N, system process space 1352, tenant process spaces 1354, tenant management process space 1360, tenant storage space 1362, user storage 1364, and application metadata 1366. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1316, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 1318 may be a framework that allows the creation, management, and execution of applications in system 1316. Such applications may be developed by the database service provider or by users or third-party application developers accessing the service. Application platform 1318 includes an application setup mechanism 1338 that supports application developers' creation and management of applications, which may be saved as metadata into tenant data storage 1322 by save routines 1336 for execution by subscribers as one or more tenant process spaces 1354 managed by tenant management process 1360 for example. Invocations to such applications may be coded using PL/SOQL 1334 that provides a programming language style interface extension to API 1332. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 1366 for a subscriber making such an invocation. Such system processes may also manage execution of application metadata 1366 as an application in a virtual machine.

In some implementations, each application server 1350 may handle requests for any user associated with any organization. A load balancing function (e.g., an F5 Big-IP load balancer) may distribute requests to the application servers 1350 based on an algorithm such as least-connections, round robin, observed response time, etc. Each application server 1350 may be configured to communicate with tenant data storage 1322 and the tenant data 1323 therein, and system data storage 1324 and the system data 1325 therein to serve requests of user systems 1312. The tenant data 1323 may be divided into individual tenant storage spaces 1362, which can be either a physical arrangement and/or a logical arrangement of data. Within each tenant storage space 1362, user storage 1364 and application metadata 1366 may be similarly allocated for each user. For example, a copy of a user's most recently used (MRU) items might be stored to user storage 1364. Similarly, a copy of MRU items for an entire tenant organization may be stored to tenant storage space 1362. A UI 1330 provides a user interface and an API 1332 provides an application programming interface to system 1316 resident processes to users and/or developers at user systems 1312.

System 1316 may implement a web-based digital asset management system. For example, in some implementations, system 1316 may include application servers configured to implement and execute software applications related to creation, managing, and transferring digital assets. The application servers may be configured to provide related data, code, forms, web pages and other information to and from user systems 1312. Additionally, the application servers may be configured to store information to, and retrieve information from a database system. Such information may include related data, objects, and/or Webpage content. With a multi-tenant system, data for multiple tenants may be stored in the same physical database object in tenant data storage 1322, however, tenant data may be arranged in the storage medium(s) of tenant data storage 1322 so that data of one tenant is kept logically separate from that of other tenants. In such a scheme, one tenant may not access another tenant's data, unless such data is expressly shared.

Several elements in the system shown in FIG. 13 include conventional, well-known elements that are explained only briefly here. For example, user system 1312 may include processor system 1312A, memory system 1312B, input system 1312C, and output system 1312D. A user system 1312 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 1312 to access, process and view information, pages and applications available from system 1316 over network 1314. Network 1314 may be any network or combination of networks of devices that communicate with one another, such as any one or any combination of a LAN (local area network), WAN (wide area network), wireless network, or other appropriate configuration.

The users of user systems 1312 may differ in their respective capacities, and the capacity of a particular user system 1312 to access information may be determined at least in part by "permissions" of the particular user system 1312. As discussed herein, permissions generally govern access to computing resources such as data objects, components, and other entities of a computing system, such as a digital asset management system, a social networking system, and/or a CRM database system. "Permission sets" generally refer to groups of permissions that may be assigned to users of such a computing environment. For instance, the assignments of users and permission sets may be stored in one or more databases of System 1316. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1316 may provide on-demand database service to user systems 1312 using an MTS arrangement. By way of example, one tenant organization may be a company that employs a sales force where each salesperson uses system 1316 to manage their sales process. Thus, a user in such an organization may maintain contact data, leads data, customer follow-up data, performance data, goals and progress data, etc., all applicable to that user's personal sales process (e.g., in tenant data storage 1322). In this arrangement, a user may manage his or her sales efforts and cycles from a variety of devices, since relevant data and applications to interact with (e.g., access, view, modify, report, transmit, calculate, etc.) such data may be maintained and accessed by any user system 1312 having network access.

When implemented in an MTS arrangement, system 1316 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1316 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1316 may also maintain system-level data usable by multiple tenants or other data. Such system-level data may include industry reports, news, postings, and the like that are sharable between tenant organizations.

In some implementations, user systems 1312 may be client systems communicating with application servers 1350 to request and update system-level and tenant-level data from system 1316. By way of example, user systems 1312 may send one or more queries requesting data of a database maintained in tenant data storage 1322 and/or system data storage 1324. An application server 1350 of system 1316 may automatically generate one or more SQL statements (e.g., one or more SQL queries) that are designed to access the requested data. System data storage 1324 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. In some implementations, entity tables may store information related to smart contracts and/or digital asset management. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figures 14A, 14B:
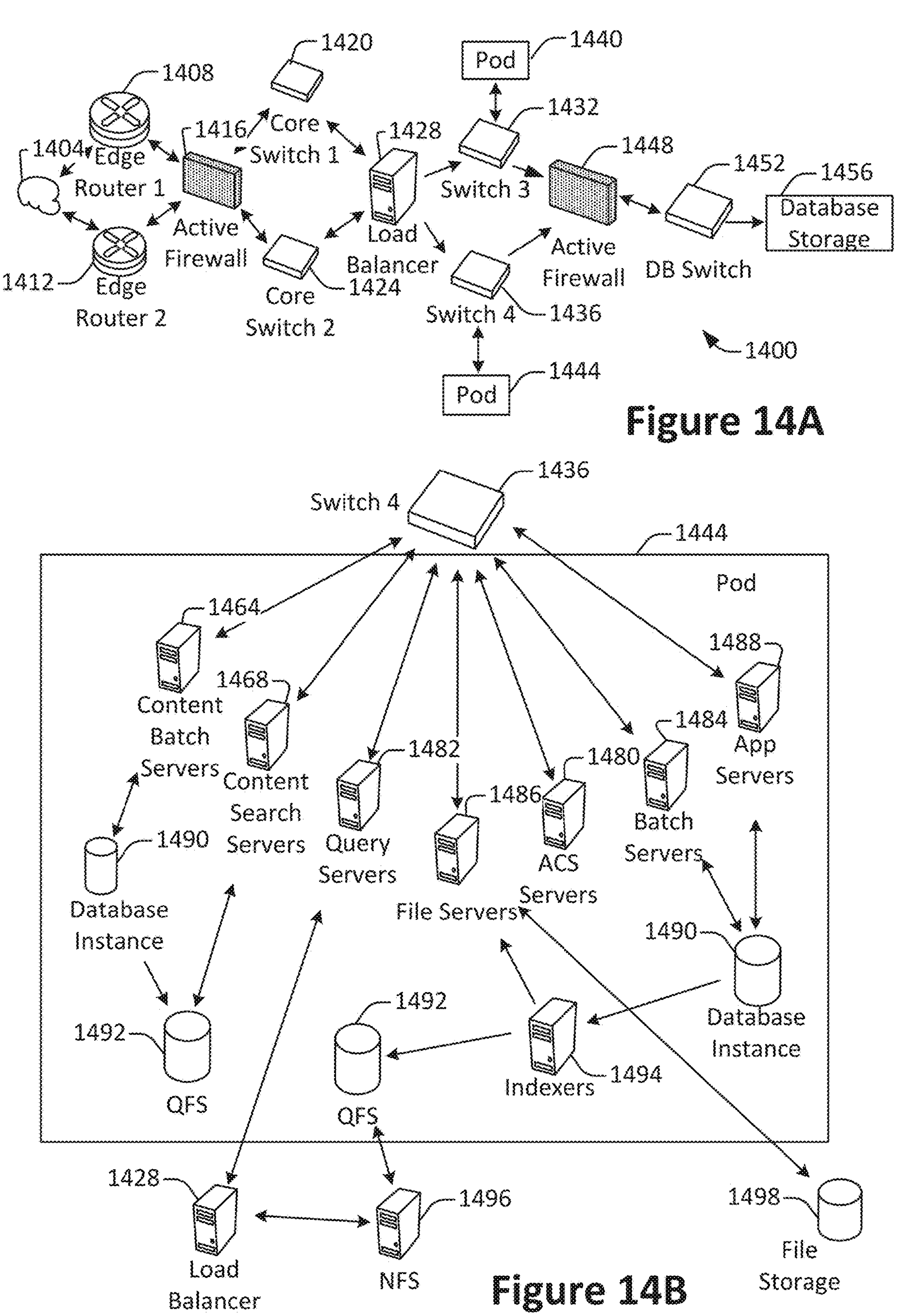
FIG. 14A shows a system diagram of an example of architectural components of an on-demand database service environment, configured in accordance with one or more embodiments.
FIG. 14B shows a system diagram further illustrating an example of architectural components of an on-demand database service environment, configured in accordance with one or more embodiments.

FIG. 14A shows a system diagram of an example of architectural components of an on-demand database service environment 1400, configured in accordance with some implementations. A client machine located in the cloud 1404 may communicate with the on-demand database service environment via one or more edge routers 1408 and 1412. A client machine may include any of the examples of user systems 812 described above. The edge routers 1408 and 1412 may communicate with one or more core switches 1420 and 1424 via firewall 1416. The core switches may communicate with a load balancer 1428, which may distribute server load over different pods, such as the pods 1440 and 1444 by communication via pod switches 1432 and 1436. The pods 1440 and 1444, which may each include one or more servers and/or other computing resources, may perform data processing and other operations used to provide on-demand services. Components of the environment may communicate with a database storage 1456 via a database firewall 1448 and a database switch 1452.

Accessing an on-demand database service environment may involve communications transmitted among a variety of different components. The environment 1400 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 14A and 14B.

The cloud 1404 refers to any suitable data network or combination of data networks, which may include the Internet. Client machines located in the cloud 1404 may communicate with the on-demand database service environment 1400 to access services provided by the on-demand database service environment 1400. By way of example, client machines may access the on-demand database service environment 1400 to retrieve, store, edit, and/or process public trust ledger and/or digital asset creation, management, and transfer information.

In some implementations, the edge routers 1408 and 1412 route packets between the cloud 1404 and other components of the on-demand database service environment 1400. The edge routers 1408 and 1412 may employ the Border Gateway Protocol (BGP). The edge routers 1408 and 1412 may maintain a table of IP networks or 'prefixes', which designate network reachability among autonomous systems on the internet.

In one or more implementations, the firewall 1416 may protect the inner components of the environment 1400 from internet traffic. The firewall 1416 may block, permit, or deny access to the inner components of the on-demand database service environment 1400 based upon a set of rules and/or other criteria. The firewall 1416 may act as one or more of a packet filter, an application gateway, a stateful filter, a proxy server, or any other type of firewall.

In some implementations, the core switches 1420 and 1424 may be high-capacity switches that transfer packets within the environment 1400. The core switches 1420 and 1424 may be configured as network bridges that quickly route data between different components within the on-demand database service environment. The use of two or more core switches 1420 and 1424 may provide redundancy and/or reduced latency.

In some implementations, communication between the pods 1440 and 1444 may be conducted via the pod switches 1432 and 1436. The pod switches 1432 and 1436 may facilitate communication between the pods 1440 and 1444 and client machines, for example via core switches 1420 and 1424. Also or alternatively, the pod switches 1432 and 1436 may facilitate communication between the pods 1440 and 1444 and the database storage 1456. The load balancer 1428 may distribute workload between the pods, which may assist in improving the use of resources, increasing throughput, reducing response times, and/or reducing overhead. The load balancer 1428 may include multilayer switches to analyze and forward traffic.

In some implementations, access to the database storage 1456 may be guarded by a database firewall 1448, which may act as a computer application firewall operating at the database application layer of a protocol stack. The database firewall 1448 may protect the database storage 1456 from application attacks such as structure query language (SQL) injection, database rootkits, and unauthorized information disclosure. The database firewall 1448 may include a host using one or more forms of reverse proxy services to proxy traffic before passing it to a gateway router and/or may inspect the contents of database traffic and block certain content or database requests. The database firewall 1448 may work on the SQL application level atop the TCP/IP stack, managing applications' connection to the database or SQL management interfaces as well as intercepting and enforcing packets traveling to or from a database network or application interface.

In some implementations, the database storage 1456 may be an on-demand database system shared by many different organizations. The on-demand database service may employ a single-tenant approach, a multi-tenant approach, a virtualized approach, or any other type of database approach. Communication with the database storage 1456 may be conducted via the database switch 1452. The database storage 1456 may include various software components for handling database queries. Accordingly, the database switch 1452 may direct database queries transmitted by other components of the environment (e.g., the pods 1440 and 1444) to the correct components within the database storage 1456.

FIG. 14B shows a system diagram further illustrating an example of architectural components of an on-demand database service environment, in accordance with some implementations. The pod 1444 may be used to render services to user(s) of the on-demand database service environment 1400. The pod 1444 may include one or more content batch servers 1464, content search servers 1468, query servers 1482, file servers 1486, access control system (ACS) servers 1480, batch servers 1484, and app servers 1488. Also, the pod 1444 may include database instances 1490, quick file systems (QFS) 1492, and indexers 1494. Some or all communication between the servers in the pod 1444 may be transmitted via the switch 1436.

In some implementations, the app servers 1488 may include a framework dedicated to the execution of procedures (e.g., programs, routines, scripts) for supporting the construction of applications provided by the on-demand database service environment 1400 via the pod 1444. One or more instances of the app server 1488 may be configured to execute all or a portion of the operations of the services described herein.

In some implementations, as discussed above, the pod 1444 may include one or more database instances 1490. A database instance 1490 may be configured as an MTS in which different organizations share access to the same database, using the techniques described above. Database information may be transmitted to the indexer 1494, which may provide an index of information available in the database 1490 to file servers 1486. The QFS 1492 or other suitable filesystem may serve as a rapid-access file system for storing and accessing information available within the pod 1444. The QFS 1492 may support volume management capabilities, allowing many disks to be grouped together into a file system. The QFS 1492 may communicate with the database instances 1490, content search servers 1468 and/or indexers 1494 to identify, retrieve, move, and/or update data stored in the network file systems (NFS) 1496 and/or other storage systems.

In some implementations, one or more query servers 1482 may communicate with the NFS 1496 to retrieve and/or update information stored outside of the pod 1444. The NFS 1496 may allow servers located in the pod 1444 to access information over a network in a manner similar to how local storage is accessed. Queries from the query servers 1422 may be transmitted to the NFS 1496 via the load balancer 1428, which may distribute resource requests over various resources available in the on-demand database service environment 1400. The NFS 1496 may also communicate with the QFS 1492 to update the information stored on the NFS 1496 and/or to provide information to the QFS 1492 for use by servers located within the pod 1444.

In some implementations, the content batch servers 1464 may handle requests internal to the pod 1444. These requests may be long-running and/or not tied to a particular customer, such as requests related to log mining, cleanup work, and maintenance tasks. The content search servers 1468 may provide query and indexer functions such as functions allowing users to search through content stored in the on-demand database service environment 1400. The file servers 1486 may manage requests for information stored in the file storage 1498, which may store information such as documents, images, basic large objects (BLOBs), etc. The query servers 1482 may be used to retrieve information from one or more file systems. For example, the query system 1482 may receive requests for information from the app servers 1488 and then transmit information queries to the NFS 1496 located outside the pod 1444. The ACS servers 1480 may control access to data, hardware resources, or software resources called upon to render services provided by the pod 1444. The batch servers 1484 may process batch jobs, which are used to run tasks at specified times. Thus, the batch servers 1484 may transmit instructions to other servers, such as the app servers 1488, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 15:
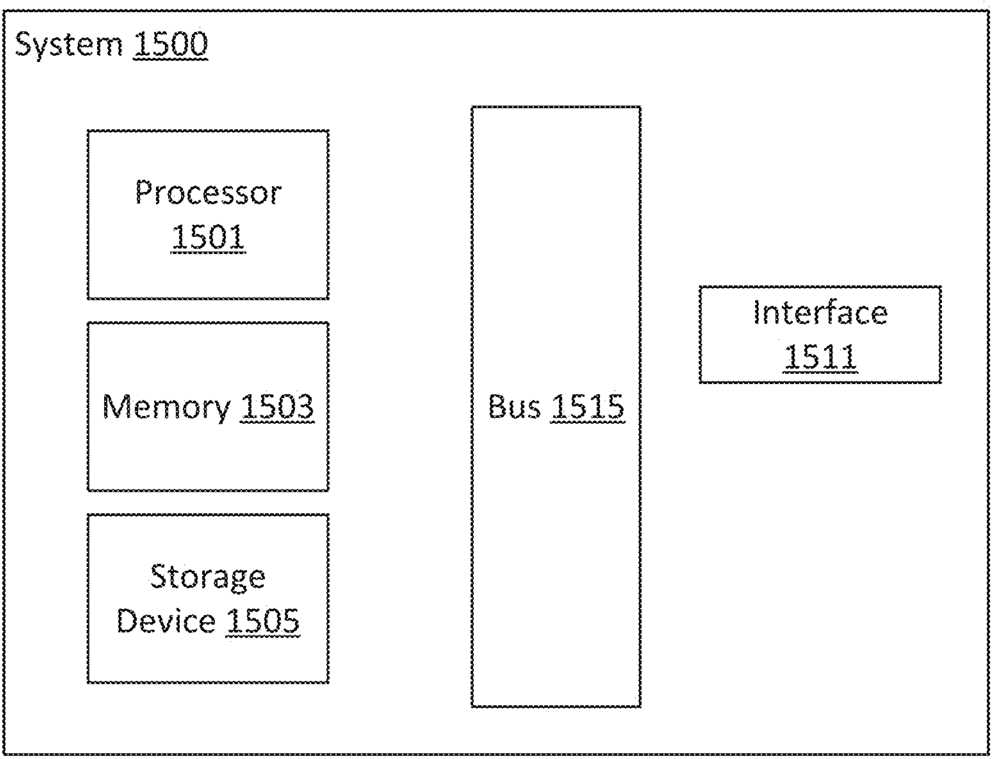
FIG. 15 illustrates one example of a computing device, configured in accordance with one or more embodiments.

FIG. 15 illustrates one example of a computing device, configured in accordance with one or more embodiments. According to various embodiments, a system 1500 suitable for implementing embodiments described herein includes a processor 1501, a memory module 1503, a storage device 1505, an interface 1511, and a bus 1515 (e.g., a PCI bus or other interconnection fabric.) System 1500 may operate as variety of devices such as an application server, a database server, or any other device or service described herein. Although a particular configuration is described, a variety of alternative configurations are possible. The processor 1501 may perform operations such as those described herein. Instructions for performing such operations may be embodied in the memory 1503, on one or more non-transitory computer readable media, or on some other storage device. Various specially configured devices can also be used in place of or in addition to the processor 1501. The interface 1511 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:

identifying, via a processor, a digital asset referenced in one or more database tables within an on-demand database system providing customer relations management services to a plurality of tenants, the one or more database tables including a first database table entry identifying the digital asset as being owned by a first database tenant of the plurality of tenants;

transmitting, by a communication interface, one or more instructions for generating a token via a smart contract recorded within a distributed trust ledger external to the database system, the token being owned by a first account within the distributed trust ledger, the on-demand database system including a correspondence linking the first database tenant with the first account, the token including both a token identifier identifying the token in the distributed trust ledger and a digital asset identifier identifying the digital asset in the on-demand database system;

receiving, by the communication interface, a message indicating that a transaction identifying the token has been recorded within the distributed trust ledger, the transaction complying with a token-specific transfer restriction specifying a party to which transfer of the token is prohibited, specifying a plurality of rights associated with the digital asset and capable of being transferred to a recipient, and further specifying a first database account associated with the digital asset and the plurality of rights, the token-specific transfer restriction being reflected in the metadata included in the smart contract stored on the distributed trust ledger;

updating the one or more database tables within the on-demand database system to include a second database table entry linking the digital asset with the token;

receiving at the on-demand database system an indication of a transaction request to transfer the token to the recipient public trust ledger party;

updating the one or more database tables within the on-demand database system to include a third database table entry linking the digital asset identifier and the token identifier with the recipient public trust ledger party when the transaction request complies with the token-specific transfer restriction;

recording a transaction within the distributed trust ledger, the transaction transferring ownership of the token from the first account to a second account within the distributed trust ledger; and updating the on-demand database system to include a second one or more database entries indicating that the token is owned by a second one of the plurality of tenants, the correspondence linking the second tenant with the second account.

2. The method recited in claim 1, wherein the smart contract comprises computer programming code providing a self-executing agreement for transferring the token.

3. The method recited in claim 2, wherein generating the smart contract comprises executing a token minting process associated with the distributed trust ledger by communicating with one or more remote computing devices via the internet.

4. The method recited in claim 2, wherein the smart contract includes a private key and a public key that together facilitate encrypted communication with the smart contract via a public key encryption protocol.

5. The method recited in claim 1, wherein the on-demand database system includes a first one or more database entries indicating that the token is owned by the first tenant.

6. The method recited in claim 1, wherein the distributed trust ledger is publicly accessible outside the on-demand database system.

7. The method recited in claim 1, wherein the token is a non-fungible token.

8. The method recited in claim 1, wherein the token is a fungible token.

9. The method recited in claim 1, wherein the distributed trust ledger is a blockchain.

10. The method recited in claim 9, wherein the blockchain is Ethereum.

11. The method recited in claim 1, wherein the on-demand database system includes a multitenant database storing data associated with a plurality of tenants, and wherein the first tenant corresponds with a designated one of the plurality of tenants.

12. An on-demand database system comprising:

a processor configured to identify a digital asset referenced in one or more database tables within an on-demand database system providing customer relations management services to a plurality of tenants, the one or more database tables including a first database table entry identifying the digital asset as being owned by a first database tenant of the plurality of tenants;

a communication interface configured to transmit one or more instructions for generating a token via a smart contract recorded within a distributed trust ledger external to the database system, the token being owned by a first account within the distributed trust ledger, the on-demand database system including a correspondence linking the first database tenant with the first account, the token including both a token identifier identifying the token in the distributed trust ledger and a digital asset identifier identifying the digital asset in the on-demand database system, wherein the communication interface is further configured to receive a message indicating that a transaction identifying the token has been recorded within the distributed trust ledger, the transaction complying with a token-specific transfer restriction specifying a party to which transfer of the token is prohibited, specifying a plurality of rights associated with the digital asset and capable of being transferred to a recipient, and further specifying a first database account associated with the digital asset and the plurality of rights, the token-specific transfer restriction being reflected in the metadata included in the smart contract stored on the distributed trust ledger; and a database interface configured to update the one or more database tables within the on-demand database system to include a second database table entry linking the digital asset with the token, wherein the on-demand database system is configured to receive an indication of a transaction request to transfer the token to the recipient public trust ledger party, wherein the database interface is configured to update the one or more database tables to include a third database table entry linking the digital asset identifier and the token identifier with the recipient public trust ledger party when the transaction request complies with the token-specific transfer restriction, wherein the database interface is further configured to record a transaction within the distributed trust ledger, the transaction transferring ownership of the token from the first account to a second account within the distributed trust ledger, and wherein the database interface is further configured to update the on-demand database system to include a second one or more database entries indicating that the token is owned by a second one of the plurality of tenants, the correspondence linking the second tenant with the second account.

13. The on-demand database system recited in claim 12, wherein the smart contract comprises computer programming code providing a self-executing agreement for transferring the token, and wherein generating the smart contract comprises executing a token minting process associated with the distributed trust ledger by communicating with one or more remote computing devices via the internet.

14. One or more non-transitory computer readable media having instructions stored thereon for performing a method, the method comprising:

identifying, via a processor, a digital asset referenced in one or more database tables within an on-demand database system providing customer relations management services to a plurality of tenants, the one or more database tables including a first database table entry identifying the digital asset as being owned by a first database tenant of the plurality of tenants;

transmitting, by a communication interface, one or more instructions for generating a token via a smart contract recorded within a distributed trust ledger external to the database system, the token being owned by a first account within the distributed trust ledger, the on-demand database system including a correspondence linking the first database tenant with the first account, the token including both a token identifier identifying the token in the distributed trust ledger and a digital asset identifier identifying the digital asset in the on-demand database system;

receiving, by the communication interface, a message indicating that a transaction identifying the token has been recorded within the distributed trust ledger, the transaction complying with a token-specific transfer restriction specifying a party to which transfer of the token is prohibited, specifying a plurality of rights associated with the digital asset and capable of being transferred to a recipient, and further specifying a first database account associated with the digital asset and the plurality of rights, the token-specific transfer restriction being reflected in the metadata included in the smart contract stored on the distributed trust ledger;

updating the one or more database tables within the on-demand database system to include a second database table entry linking the digital asset with the token;

receiving at the on-demand database system an indication of a transaction request to transfer the token to the recipient public trust ledger party;

updating the one or more database tables within the on-demand database system to include a third database table entry linking the digital asset identifier and the token identifier with the recipient public trust ledger party when the transaction request complies with the token-specific transfer restriction;

recording a transaction within the distributed trust ledger, the transaction transferring ownership of the token from the first account to a second account within the distributed trust ledger; and updating the on-demand database system to include a second one or more database entries indicating that the token is owned by a second one of the plurality of tenants, the correspondence linking the second tenant with the second account.

15. The one or more non-transitory computer readable media recited in claim 14, wherein the smart contract comprises computer programming code providing a self-executing agreement for transferring the token, and wherein generating the smart contract comprises executing a token minting process associated with the distributed trust ledger by communicating with one or more remote computing devices via the internet.

* * * * *